United States Patent [19]
Hasebe et al.

[11] Patent Number: 5,863,457
[45] Date of Patent: Jan. 26, 1999

[54] POLYMERIZABLE LIQUID CRYSTAL COMPOSITION AND OPTICALLY ANISOTROPIC FILM COMPRISING THE SAME

[75] Inventors: Hiroshi Hasebe, Saitama; Haruyoshi Takatsu; Kiyofumi Takeuchi, both of Tokyo, all of Japan

[73] Assignee: Dainippon Ink and Chemicals, Inc., Tokyo, Japan

[21] Appl. No.: 657,526

[22] Filed: Jun. 4, 1996

Related U.S. Application Data

[63] Continuation of Ser. No. 362,958, Dec. 23, 1994, abandoned.

[30] Foreign Application Priority Data

| Dec. 24, 1993 | [JP] | Japan | 5-328662 |
| Apr. 22, 1994 | [JP] | Japan | 6-084696 |
| Apr. 22, 1994 | [JP] | Japan | 6-084697 |
| Apr. 25, 1994 | [JP] | Japan | 6-086348 |
| Jul. 6, 1994 | [JP] | Japan | 6-154574 |
| Jul. 6, 1994 | [JP] | Japan | 6-155024 |
| Jul. 8, 1994 | [JP] | Japan | 6-157171 |
| Jul. 14, 1994 | [JP] | Japan | 6-162058 |
| Jul. 26, 1994 | [JP] | Japan | 6-174164 |
| Sep. 22, 1994 | [JP] | Japan | 6-228250 |

[51] Int. Cl.$^6$ .......... C09K 19/52; C09K 19/34; C09K 19/32; C09K 19/20
[52] U.S. Cl. .......... 252/299.01; 252/299.61; 252/299.62; 252/299.63; 252/299.66; 252/299.67; 428/1
[58] Field of Search .......... 252/299.01, 299.67, 252/299.63, 299.61, 299.62, 299.66; 428/1

[56] References Cited

U.S. PATENT DOCUMENTS

| 4,892,392 | 1/1990 | Broer | 359/103 |
| 5,077,380 | 12/1991 | Hefner et al. | 528/322 |
| 5,188,760 | 2/1993 | Hikmet et al. | 252/299.01 |
| 5,193,020 | 3/1993 | Shiozaki et al. | 359/103 |
| 5,210,630 | 5/1993 | Heynderickx et al. | 359/196 |
| 5,258,134 | 11/1993 | Yoshinaga et al. | 252/299.01 |
| 5,326,496 | 7/1994 | Iida et al. | 252/299.01 |
| 5,372,745 | 12/1994 | Yoshinaga et al. | 252/299.01 |
| 5,686,017 | 11/1997 | Kobayashi et al. | 252/299.01 |
| 5,688,436 | 11/1997 | Ohnishi et al. | 252/299.01 |

FOREIGN PATENT DOCUMENTS

| 0 090 282 A1 | 10/1983 | European Pat. Off. |
| 0 524 028 A1 | 1/1993 | European Pat. Off. |
| 0 527 231 A1 | 2/1993 | European Pat. Off. |
| 0 529 813 A2 | 3/1993 | European Pat. Off. |
| 0 531 120 A1 | 3/1993 | European Pat. Off. |
| 0 563 403 A1 | 10/1993 | European Pat. Off. |
| 3 837 936 A1 | 5/1990 | Germany. |
| 58-102205 | 6/1983 | Japan. |
| 62-70406 | 3/1987 | Japan. |
| 62-70407 | 3/1987 | Japan. |
| 3-17121 | 1/1991 | Japan. |
| 4-3022 | 1/1992 | Japan. |
| 2 002 767 A | 2/1979 | United Kingdom. |
| 93/08497 | 4/1993 | WIPO. |

OTHER PUBLICATIONS

*Macromol, Chem.*, vol. 192, pp. 59–74 (1991).
*Mol. Cryst. Liquid. Cryst. Inc. Nonlin. Opt.*, vol. 157, p. 639 (1988).
*Makromol. Chem.*, vol. 193, p. 1235 (1992).
Bull. of Soc. Chim. of France, 1975, pp. 2073–2076, Liébert et al.; "Polymerisation de Monomeres Mesomorphes Initiee Par Rayonement Ultraviolet".
Journal of Polymer Science, Polymer Letters Edition, vol. 13, 1975, pp. 243–246, E. Perplies et al.
European Polymer Journal, vol. 28, No. 8, Aug. 1992, pp. 907–909; M.V. Koxlovsky, "Chiral Smectic Side–chain Copolymers–2 . . . Polymerization".
Die Makromolekulare Chemie, vol. 193, No. 11, Nov. 1992, pp. 2271–2780, N.A. Nikonorova et al., "Local Mobility and Liquid–crystalline State in Side–Chain Polymers . . . ".
Molecular Crystals and Liquid Crystals, vol. 157, Apr. 1988, pp. 319–329 F. CSER, "NMR Studies on Side–Chain Mesomorphic Polymers".

*Primary Examiner*—Shean C. Wu
*Attorney, Agent, or Firm*—Armstrong, Westerman, Hattori, McLeland & Naughton

[57] ABSTRACT

The present invention provides a novel polymerizable liquid crystal composition which can be used as an optical material, display material or recording material. More particularly, the present invention provides an optically anisotropic film comprising a photopolymerization product of such a polymerizable liquid crystal composition having a high orientation state fixed therein which functions to control light and is suitable for the application in the field of optoelectronics, liquid crystal display, etc. The present invention further provides a process for the preparation of such an optically anisotropic film. Moreover, the present invention provides a liquid crystal device comprising the foregoing optically anisotropic film.

42 Claims, 6 Drawing Sheets

ELECTRODE LAYER (A)
ELECTRODE LAYER (B)
ELECTRODE LAYER (C)

RUBBING DIRECTION

RUBBING DIRECTION

RUBBING DIRECTION
45

ELECTRODE LAYER (A")
ELECTRODE LAYER (B")
ELECTRODE LAYER (C")

POLYMERIZABLE LIQUID CRYSTAL COMPOSITION AND OPTICALLY ANISOTROPIC FILM COMPRISING THE SAME

This application is a continuation of application Ser. No. 08/362,958 filed Dec. 23, 1994, now abandoned.

FIELD OF THE INVENTION

The present invention relates to a novel polymerizable liquid crystal composition which can be used as an optical material, display material or recording material. More particularly, the present invention relates to an optically anisotropic film comprising a photopolymerization product of such a polymerizable liquid crystal composition having a high orientation state fixed therein which functions to control light and is suitable for the application in the field of optoelectronics, liquid crystal display, etc. The present invention further relates to a process for the preparation of such an optically anisotropic film. Moreover, the present invention relates to a liquid crystal device comprising the foregoing optically anisotropic film.

BACKGROUND OF THE INVENTION

In recent years, liquid crystal substances have been applied to display media utilizing the reversible motion of liquid crystal molecules such as display elements represented by TN (twisted nematic) type and STN (supertwisted nematic) type liquid crystal display elements. Besides these applications, these liquid crystal substances have been studied for application to optically anisotropic films such as optical phase retardation plate, polarizing plate, light polarizing prism and light filter taking advantage of its anisotropy in physical properties such as olientability, refractive index, dielectric constant and magnetizability.

In such an optically anisotropic film comprising a liquid crystal substance as a constituent component, it is essential that the uniform alignment of the liquid crystal be semipermanently fixed to obtain stable and uniform optical properties.

As a method for semipermanently fixing the uniform alignment of the liquid crystal, there has already been known a method which comprises aligning a liquid crystalline compound containing a polymerizable functional group or a polymerizable liquid crystal composition containing such a compound in liquid crystalline state, and then irradiating the material with energy rays such as ultraviolet ray while maintaining in the liquid crystalline state.

As such a technique there may be exemplified one employing the following liquid crystalline compound.

For example, JP-A-58-102205 (The term "JP-A" as used herein means an "unexamined published Japanese patent application") discloses as a liquid crystal compound containing a polymerizable functional group a compound represented by the following formula:

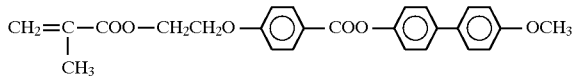

However, the foregoing compound is disadvantageous in that it exhibits a nematic phase at a temperature as very high as between 108° and 211° C. and an optically anisotropic film (color polarizing plate) prepared by the photopolymerization of a polymerizable composition containing such a compound in liquid crystal state actually shows a nonuniform external appearance, causing unevenness.

JP-A-4-140921 discloses an optically anisotropic film prepared by a process which comprises the polymerization of a bifunctional acrylate compound represented by the following general formula (R-2):

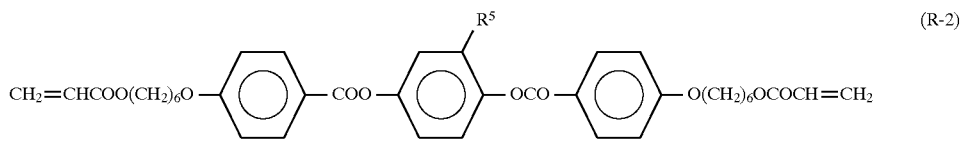

wherein $R^5$ represents a hydrogen atom or a methyl group as a liquid crystal compound having a polymerizable functional group to form a polymer network. The foregoing patent also discloses a technique for obtaining an optical compensation plate (phase retardation plate) suitable for STN liquid crystal display by adding a chiral compound to the polymerizable composition of the general formula (R-2) to introduce a helical structure of the mesogenic core of the liquid crystal into the optically anisotropic film.

The use of the compound of the general formula (R-2) has advantages of mechanical strength and heat resistance. However, as exemplified in the foregoing patent, a liquid crystal composition made of 80 parts by weight of a compound of the general formula (R-2) wherein $R^5$ is a methyl group and 20 parts by weight of a compound of the general formula (R-2) wherein $R^5$ is a hydrogen atom exhibits a nematic phase at a temperature as relatively higher than room temperature as between 80° and 121° C., and an optically anisotropic film prepared from such a polymerizable liquid crystal composition disadvantageously exhibits nonuniformity of the orientation of mesogenic core of the liquid crystal, also due to inducing the undesirable heat polymerization.

The foregoing method for fixing the alignment of liquid crystal is disadvantageous in that the liquid crystalline phase of the polymerizable liquid crystal compound or polymerizable liquid crystal composition is in a relatively high temperature range, inducing photopolymerization by energy ray as well as undesirable heat polymerization that causes the loss of uniform orientation of the liquid crystal molecules. Thus, nonuniform orientation of the resultant polymer different from the desired orientation is obtained.

In this respect, it is necessary that the polymerizable liquid crystal or polymerizable liquid crystal composition has liquid crystalline temperature range in the vicinity of room temperature and that photopolymerization of the polymerizable liquid crystal or polymerizable liquid crystal composition is carried out in the vicinity of room temperature to avoid the progress of undesirable heat polymerization.

In order to solve the foregoing problem, JP-A-62-70406 discloses the use of a compound represented by the following general formula (R-1):

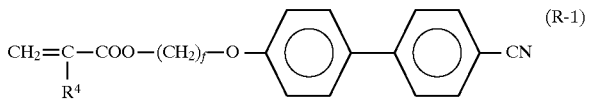

wherein f represents an integer 2, 5 or 6; and $R^4$ represents a hydrogen atom or a methyl group as a liquid crystal compound containing a polymerizable functional group.

The foregoing patent has no definite reference to the phase transition temperature of the liquid crystal compound used. But, the foregoing patent discloses that photopolymerization at 50° C. can provide a uniform optically anisotropic film.

However, the optically anisotropic film obtained by the photopolymerization of the compound of the general formula (R-1) is disadvantageous in that it has a low mechanical strength. The optically anisotropic film thus obtained is also disadvantageous in that when heated to around 100° C., it loses a fixed uniform orientation, restricting its use as an optically anisotropic film.

The approach disclosed in the foregoing patent is further disadvantageous in that all the liquid crystalline acrylates exhibit a monotropically liquid crystalline phase and thus tend to undergo crystallization during photopolymerization, making it difficult to obtain an optically anisotropic film in which a uniform orientation of the mesogenic core of liquid crystal, which is fixed by photopolymerization.

Moreover, JP-A-4-227611 discloses liquid crystalline acrylate compositions containing a compound represented by the following general formula (R-3):

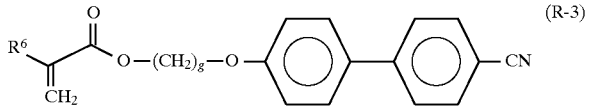

wherein $R^6$ represents a hydrogen atom or a methyl group; and g represents an integer 5, 6, 8, 9, 10, 11 or 12. All these compositions only exhibit a monotropically nematic phase as mentioned above. Most of these compositions immediately undergo crystallization at room temperature. These compositions exhibited a stable nematic phase, if any, for only one day at longest.

As another method for semipermanently fixing the uniform orientation of the mesogenic core of liquid crystal, there has already been known a method which comprises the use of a liquid crystalline polymer compound.

In some detail, the foregoing method comprises applying a solution of liquid crystalline polymer which exhibits a thermotropic liquid crystallinity to a substrate which is treated to align the liquid crystalline polymer, and then subjecting the material to heat at a temperature at which the liquid crystalline polymer compound exhibits a liquid crystalline phase to obtain a desired orientation of mesogenic core of liquid crystalline polymer. The polymer compound thus oriented is kept in glass state so that the desired orientation is fixed therein. JP-A-4-3022 discloses that a compensation plate having a homogeneous orientation structure can be used as a color compensation plate for STN liquid crystal display. JP-A-5-27235 discloses that a compensation plate having a homeotropic orientation structure can be used as a compensation plate for viewing angle dependence of TN and STN liquid crystal display. JP-A-5-61039 discloses that a compensation plate having a cholesteric orientation structure can be used as a compensation plate for the viewing angle dependence of TN liquid crystal display.

Further, an approach is known which comprises the use of a film having a thickwise refractive index greater than inplane refractive index (optically anisotropic film) as a compensation plate to reduce the viewing angle dependence of liquid crystal display element (M. Akatsuka et al., "Japan Display", 1989, page 363). As such an optically anisotropic film there is disclosed one comprising a liquid crystalline polymer compound in JP-A-5-27235 and JP-A-5-34678.

However, these compensation plates are disadvantageous in that the orientation structure in the liquid crystalline polymer compound is fixed in glass state. Thus, the orientation structure is destroyed at temperatures higher than the glass transition temperature of the liquid crystalline polymer compound. Accordingly, the working temperature is restricted to not more than the glass transition temperature of the liquid crystalline polymer compound. Further, since the viscosity of liquid crystalline polymer compounds is higher than that of low molecular liquid crystalline compounds, it takes much time to obtain a desired uniform alignment, reducing the productivity. The greater the area of the desired compensation plate is, and the higher the glass transition point of the desired liquid crystalline polymer compound is, the more remarkable is this disadvantage.

The liquid crystalline polymer compound, if used, is applied to the substrate which is treated to align liquid crystal in the form of solution in a solvent. Thus, this approach cannot be applied to substrates having a poor solvent resistance such as some plastics. Accordingly, this approach is disadvantageous in that the substrates employable are restricted by the solvent used.

Since the materials of the optically anisotropic film which has heretofore been used are limited to those described above, there arises a problem in the method for the preparation of an optically anisotropic film from these materials.

As mentioned above, neither optically anisotropic films having an excellent mechanical strength and heat resistance and good uniformity and practical value which can be obtained with a good producibility nor polymerizable liquid crystal compositions which exhibit a liquid crystalline phase in the vicinity of room temperature and can be used to obtain such optically anisotropic films have been known.

In the field of optically anisotropic film for liquid crystal display, it has been keenly desired to develop an optical compensation plate having a chiral compound-based helical structure introduced thereinto to enhance the display quality of liquid crystal display. In the field of optoelectronics such as optical logic device, it has been keenly desired to develop an optical element comprising a polymer film with a controlled orientation structure which exhibits excellent uniformity and heat resistance to facilitate the reduction of the weight of the apparatus and the rise in the area of the apparatus.

SUMMARY OF THE INVENTION

It is therefore an object of the present invention to provide a polymerizable liquid crystal composition which exhibits a liquid crystalline phase in the vicinity of room temperature and is useful as a starting material of uniform optically anisotropic film with excellent mechanical strength and heat resistivity.

It is another object of the present invention to provide an optically anisotropic film obtained by the photopolymerization of the foregoing polymerizable liquid crystal composition.

It is a further object of the present invention to provide a process for the preparation of the foregoing optically anisotropic film.

It is still further object of the present invention to provide a liquid crystal display device comprising the foregoing optically anisotropic film.

These and other objects of the present invention will become more apparent from the following detailed description and examples.

In order to solve these problems, the inventors made extensive studies focusing on a polymerizable liquid crystal composition which exhibits a liquid crystalline phase in the vicinity of room temperature. As a result, the present invention has been worked out.

The present invention provides a polymerizable liquid crystal composition, comprising a first kind of monofunctional (meth)acrylate compound which is a (meth)acrylic ester of a cyclic alcohol, phenol or aromatic hydroxy compound with a liquid crystalline skeleton having at least two 6-membered rings as a partial structure, wherein said composition exhibits a liquid crystalline phase.

Unlike the conventional polymerizable liquid crystal compositions, the polymerizable liquid crystal composition of the present invention exhibits a liquid crystalline phase in the vicinity of room temperature. Thus, a uniform orientation can be fixed without inducing any undesirable heat polymerization during the photopolymerization in liquid crystalline state, making it possible to provide an unprecedentedly excellent optically anisotropic film.

BRIEF DESCRIPTION OF THE DRAWINGS

By way of example and to make the description more clear, reference is made to the accompanying drawings in which.

DETAILED DESCRIPTION OF THE INVENTION

Figure 1:
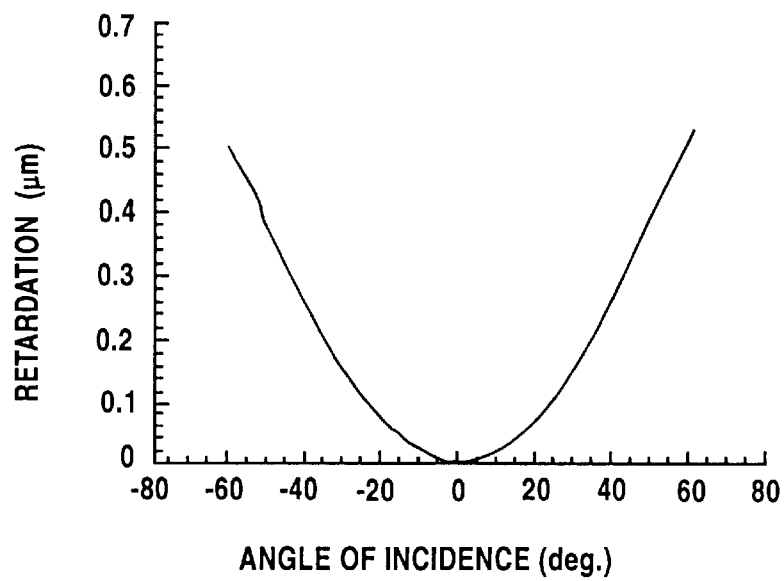
FIG. 1 is a graph illustrating the incident angular dependence of retardation of an optically anisotropic film according to the present invention.

The present invention will be further described hereinafter.

The foregoing first kind of monofunctional (meth)acrylate compound to be incorporated in the polymerizable liquid crystal composition of the present invention is a compound represented by the following general formula (I):

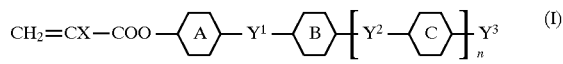

wherein X represents a hydrogen atom or a methyl group; the 6-membered rings A, B and C each independently represent

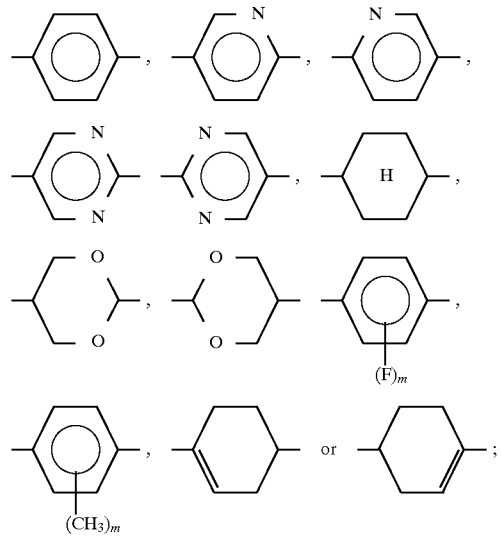

n represents an integer 0 or 1; m represents an integer 1 to 4; $Y^1$ and $Y^2$ each independently represent a single bond, $-CH_2CH_2-$, $-CH_2O-$, $-OCH_2-$, $-COO-$, $-OCO-$, $-C\equiv C-$, $-CH=CH-$, $-CF=CF-$, $-(CH_2)_4-$, $-CH_2CH_2CH_2O-$, $-OCH_2CH_2CH_2-$, $-CH=CHCH_2CH_2-$ or $-CH_2CH_2CH=CH-$; and $Y^3$ represents a hydrogen atom, a halogen atom, a cyano group, a $C_{1-20}$ alkyl group, a $C_{1-20}$ alkoxy group, a $C_{1-20}$ alkenyl group or a $C_{1-20}$ alkenyloxy group.

One of the features of the first kind of monofunctional (meth)acrylate compound of the present invention is that it is a monofunctional compound containing one polymerizable functional group and having a rigid liquid crystalline skeleton characteristic of liquid crystal which contributes to the development of liquid crystallinity.

Examples of the rigid liquid crystalline skeleton characteristic of liquid crystal include a skeleton formed by the 6-membered rings A, B and C and the linking groups $Y^1$ and $Y^2$ in the general formula (I). Because of such a feature, the first kind of monofunctional (meth)acrylate compound exhibits a liquid crystalline phase at a temperature relative lower than bifunctional compounds containing two polymerizable functional groups do.

The second feature of the first kind of monofunctional (meth)acrylate compound of the present invention is that a (meth)acrylic ester group which is a polymerizable functional group is directly connected to the foregoing cyclic structure of liquid crystalline skeleton as a (meth)acrylic ester. All the compounds disclosed in the foregoing patents are esters of n-hydroxyalkyloxy group and (meth)acrylic acid, and compound with an alkylene group interposed between the ester group and the cyclic structure of liquid crystalline skelton.

Unlike these exemplified compounds, the first kind of monofunctional (meth)acrylate compound of the present invention has no flexible linking group called "spacer" in the technical field of liquid crystal such as alkylene group and oxyalkylene group interposed between the rigid liquid crystalline skeleton and the (meth)acrylic ester group as a polymerizable functional group. It is thus thought that the main chain of a polymer obtained by the polymerization of the first kind of monofunctional (meth)acrylate compound of the present invention has a rigid liquid crystalline skeleton directly connected thereto without any spacer interposed therebetween and the motion of the rigid liquid crystalline skeleton moiety is restricted by the main chain. Because of this feature, the use of the first kind of monofunctional (meth)acrylate compound of the present invention can provide an optically anisotropic film with an excellent mechanical strength and heat resistivity.

The first kind of monofunctional (meth)acrylate compound of the present invention may or may not exhibit a liquid crystallinity itself and doesn't need to exhibit a liquid crystallinity at room temperature. It is only necessary that the polymerizable composition of the present invention comprising the first kind of monofunctional (meth)acrylate compound exhibit a liquid crystallinity in the vicinity of room temperature.

Preferred among compounds represented by the foregoing general formula (I) as the first kind of monofunctional (meth)acrylate compound are those wherein the 6-membered rings A, B and C each independently represent

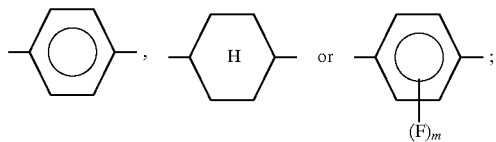

m represents an integer or 1 or 2; $Y^1$ and $Y^2$ each independently represent a single bond or —C≡C—; and $Y^3$ represents a halogen atom, a cyano group or a $C_{1-20}$ alkyl or alkoxy group.

Referring further to the compound of the general formula (I) wherein n is 0, that is, a bicyclic compound, $Y^3$ is preferably a halogen atom, a cyano group or a $C_{1-20}$ alkyl or alkoxy group. Particularly preferred among these compounds are the following compounds:

1. Compound wherein the 6-membered ring A represents

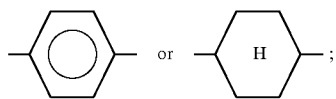

the 6-membered ring B represents

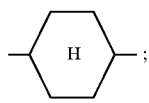

and $Y^3$ represents a $C_{1-10}$ alkyl group.

2-a. Compound wherein the 6-membered rings A and B each represent

$Y^1$ represents a single bond; and $Y^3$ represents a $C_{1-10}$ alkyl or alkoxy group or a cyano group.

2-b. Compound wherein the 6-membered rings A and B each represent

$Y^1$ represents —C≡C—; and $Y^3$ represents a $C_{1-10}$ alkyl group.

3. Compound wherein the 6-membered ring A represents

the 6-membered ring B represents

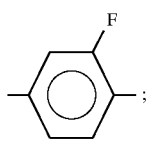

$Y^1$ represents a single bond; and $Y^3$ represents a fluorine atom.

Referring to the compound of the general formula (I) wherein n is 1, that is, a tricyclic compound, it is preferred that $Y^1$ and $Y^2$ each represent a single bond, and $Y^3$ represent a halogen atom or a $C_{1-20}$ alkyl group. Particularly preferred among these compounds are the following compounds:

4. Compound wherein the 6-membered ring A represents

the 6-membered rings B and C each represent

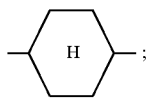

and $Y^3$ represents a $C_{1-10}$ alkyl group.

5. Compound wherein the 6-membered rings A and B each represent,

the 6-membered ring C represents

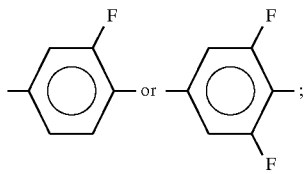

and $Y^3$ represents a fluorine atom.

Representative examples of the first kind of monofunctional (meth)acrylate compound will be listed below along with their phase transition temperature, but the polymerizable compound employable in the present invention should not be construed as being limited thereto.

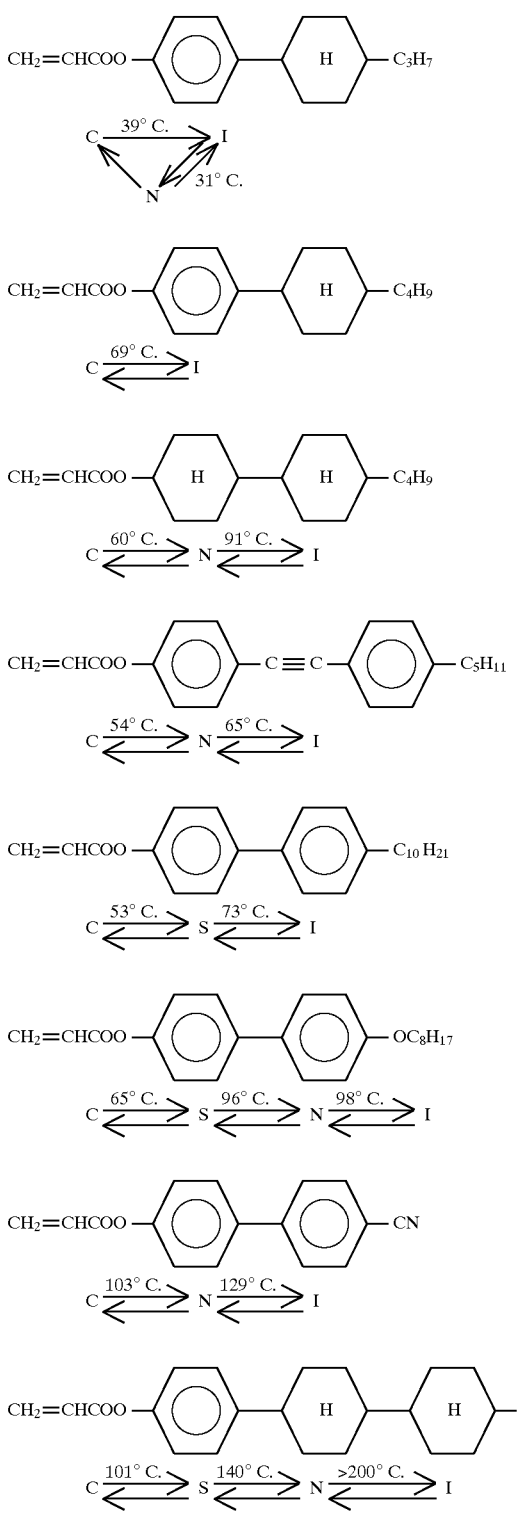

wherein the cyclohexane ring represents a transcyclohexane ring; C represents a crystalline phase; N represents a nematic phase; S represents a smectic phase; I represents an isotropic liquid phase; and the figures each indicate a phase transition temperature.

The first kind of monofunctional (meth)acrylate compound may be used singly. Alternatively, two or more of the first kind of monofunctional (meth)acrylate compounds may be used in admixture. The total amount of these first kinds of monofunctional (meth)acrylate compounds to be incorporated in the polymerizable liquid crystal composition of the present invention is preferably in the range of 50 to 100% by weight.

The polymerizable liquid crystal composition of the present invention may contain a liquid crystalline compound having a polymerizable functional group other than the first kind of monofunctional (meth)acrylate compound.

As such a liquid crystalline compound there may be used a diacrylate compound as reported by Dirk J. Broer et al., *Makromol. Chem.*, vol. 192, pp. 59–74, (1991) or an acrylate compound as disclosed in the foregoing patents. A specific example of such a liquid crystalline compound is a second kind of monofunctional (meth)acrylate compound represented by the following general formula (II):

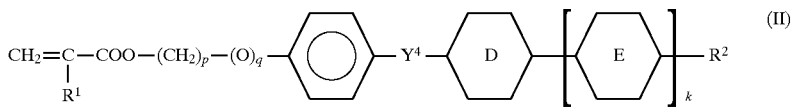

wherein $R^1$ represents a hydrogen atom or a methyl group; p represents an integer 2 to 12; q represents an integer 0 or 1; $Y^4$ represents a single bond, —COO— or —OCO—; the rings D and E each independently represent

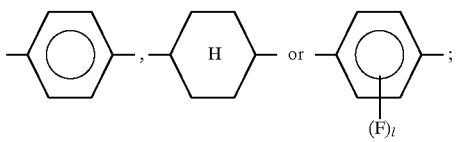

l represents an integer 1 to 4; k represents an integer 0 or 1; and $R^2$ represents a hydrogen atom, a halogen atom, a cyano group, a $C_{1-20}$ alkyl group, a $C_{1-20}$ alkoxy group, a $C_{1-20}$ alkenyl group or a phenyl group.

Examples of the second kind of monofunctional (meth) acrylate compound represented by the general formula (II) include compounds represented by the following general formulae (V), (VI) and (VII):

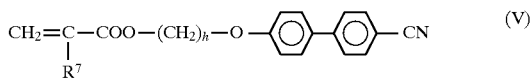 (V)

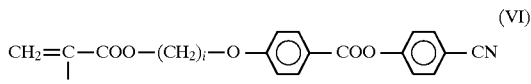 (VI)

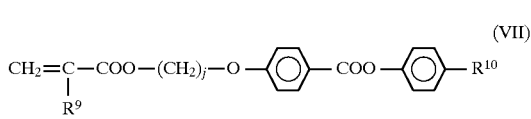 (VII)

wherein $R^7$, $R^8$ and $R^9$ each independently represent a hydrogen atom or a methyl group; h, i and j each independently represent an integer 2 to 12; and $R^{10}$ represents a cyano group or a $C_{1-6}$ alkyl group, a $C_{1-6}$ alkoxy group or a phenyl group, and compounds represented by the following general formulae (VIII) and (IX):

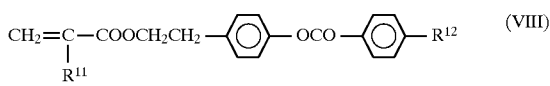 (VIII)

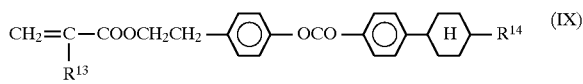 (IX)

wherein $R^{11}$ and $R^{13}$ each independently represent a hydrogen atom or a methyl group; and $R^{12}$ and $R^{14}$ each independently represent a $C_{1-6}$ alkyl group.

Further, the polymerizable liquid crystal composition of the present invention may contain a third kind of monofunctional (meth)acrylate compound having a 2,6-substituted naphthalene skeleton. Examples of the third kind of monofunctional (meth)acrylate compound include a compound represented by the following general formula (N):

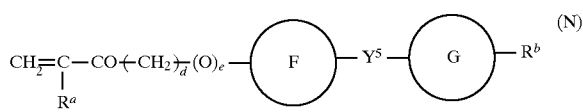 (N)

wherein $R^a$ represents a hydrogen atom or a methyl group; e represents an integer 0 or 1; d represents an integer 0 to 12 when e is 0 or an integer 1 to 12 when e is 1; $R^b$ represents a $C_{1-12}$ alkyl or alkoxy group; $Y^5$ represents —$CH_2CH_2$—, —COO—, —OCO—, —$COCH_2$— or —$CH_2O$—; and one of the rings F and G represents

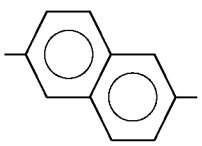

and the other represents

The polymerizable liquid crystal composition of the present invention containing the compound of the general formula (III) exerts an excellent effect of reducing or eliminating the yellowing of an optically anisotropic film obtained by the photopolymerization of a polymerizable liquid crystal composition having a great anisotropy particularly in refractive index.

The second kind of monofunctional (meth)acrylate compound represented by the general formula (II) is preferably contained in the polymerizable liquid crystal composition of the present invention in an amount of not more than 50% by weight. Further, such a polymerizable liquid crystal composition preferably exhibits an enantiotropically nematic phase at room temperature.

The polymerizable liquid crystal composition of the present invention may contain the foregoing first kind of monofunctional (meth)acrylate compound singly or in combination with either or both of the foregoing second kind of monofunctional (meth)acrylate compound and the foregoing third kind of monofunctional (meth)acrylate compound.

If the polymerizable liquid crystal composition contains the first kind of monofunctional (meth)acrylate compound in combination with the second kind of monofunctional (meth) acrylate compound, the content of the second kind of monofunctional (meth)acrylate compound is preferably not more than 50% by weight based on the weight of the first kind of monofunctional (meth)acrylate compound. This is because that as the content of the second kind of monofunctional (meth)acrylate compound increases the mechanical strength and heat resistivity of the resulting optically anisotropic film tend to be deteriorated.

On the other hand, if the polymerizable liquid crystal composition contains the first kind of monofunctional (meth)acrylate compound in combination with the third kind of monofunctional (meth)acrylate compound, the content of the third kind of monofunctional (meth)acrylate compound may be properly controlled depending on the degree of anisotropy of the refractive indices of the polymerizable liquid crystal composition but is preferably not less than 5% by weight based on the weight of the polymerizable liquid crystal composition.

The polymerizable liquid crystal composition of the present invention may comprise a chiral compound incorporated therein besides the first, second and third kinds of monofunctional (meth)acrylate compounds for the purpose of obtaining an optically anisotropic film having a helical structure. The chiral compound employable herein doesn't have to exhibit a liquid crystallinity itself and may or may not contain a polymerizable functional group. The direction of the helix can be properly selected depending on the purpose of the optically anisotropic film. Examples of such a chiral compound include cholesterol pelargonate and cholesterol stearate containing cholesteryl group as an optically active group, "CB-15", "C-15" (available from BDH), "S1082" (available from Merck & Co.), "CM-19", "CM-20" and "CM" (available from Chisso Corporation) containing 2-methylbutyl group as an optically active agent, and "S-811" (available from Merck & Co.), "CM-21" and "CM-22" (available from Chisso Corporation) containing 1-methylheptyl group as an optically active group.

As the optically active compound containing a polymerizable function group there may be preferably used an acrylate compound or methacrylate compound containing an optically active group. Any such a compound may be used without restriction so far as it induces a chiral nematic phase in a polymerizable liquid crystal composition in the vicinity of room temperature when incorporated therein. Examples of such a polymerizable optically active compound include a compound represented by the following general formula (III):

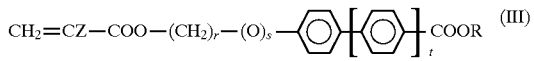

wherein Z represents a hydrogen atom or a methyl group; s represents an integer 0 or 1; r represents an integer 0 to 12 when s is 0 or an integer 1 to 12 when s is 1; t represents an integer 0 or 1; and R represents a $C_{3-12}$ optically active hydrocarbon group, a compound represented by the general formula (X) reported by Hoyle et al., *Mol. Cryst. Liquid Cryst. Inc. Nonlin. Opt.*, vol. 157, page 639 (1988):

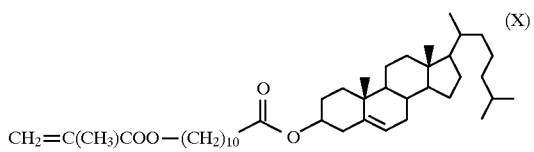

and a compound represented by the general formula (XI) reported by Ringsdorf et al., *Markromol. Chem.*, vol. 193, page 1235 (1992):

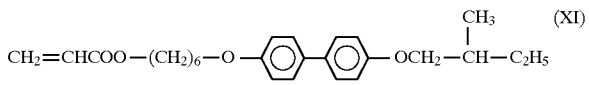

As the optically active compounds to be used in the present invention there may be used the foregoing nonpolymerizable optically active compounds or polymerizable optically active compounds singly or in admixture. In order to enhance the heat resistivity of the polymerizable liquid crystal composition, a polymerizable optically active compound represented by the general formula (III) is preferably used. The resulting polymerizable liquid crystal composition needs to exhibit a chiral nematic phase in the vicinity of room temperature.

The optimum added amount of the optically active compound may be properly adjusted depending on the purpose of the optically anisotropic film obtained by the photopolymerization of the polymerizable liquid crystal composition of the present invention or the torsional strength of the optically active compound used. For example, if an optically anisotropic film obtained by the photopolymerization of the polymerizable liquid crystal composition of the present invention is used as an optical compensation film for supertwisted nematic liquid crystal display device, the added amount of the optically active compound is preferably adjusted such that the pitch of the polymerizable liquid crystal composition is in the range of 0.1 to 15 μm. If the optically anisotropic film is used as an optical compensation film for twisted nematic liquid crystal display device, the added amount of the optically active compound is preferably adjusted such that the pitch of the polymerizable liquid crystal composition is in the range of 15 to 60 μm.

Further, if the optically anisotropic film is used for the purpose of improving the viewing angle dependence of liquid crystal display devices, the added amount of the optically active compound is preferably adjusted such that the pitch of the polymerizable liquid crystal composition is in the range of 0.1 to 3 μm.

The polymerizable liquid crystal composition of the present invention may properly comprise the following components incorporated therein besides the foregoing main components.

For example, a liquid crystal compound without polymerizable functional group may be incorporated in the polymerizable liquid crystal composition of the present invention in a total amount of not more than 10% by weight. As such a liquid crystal compound without polymerizable functional group there may be used a compound which is commonly recognized as a liquid crystal in the art, such as nematic liquid crystal compound, smectic liquid crystal compound and cholesteric liquid crystal compound, without restriction. However, as the added amount of such a liquid crystal compound without polymerizable functional group increases, the mechanical strength of the resulting polymer tends to be lowered. Accordingly, the added amount of the liquid crystal compound without polymerizable functional group should be properly adjusted.

Further, a compound which contains a polymerizable functional group but doesn't exhibit any liquid crystallinity may be incorporated in the polymerizable liquid crystal composition of the present invention. As such a compound there may be used a compound which is commonly recognized as a polymer-forming monomer or polymer-forming oligomer in the art. Acrylate compounds are particularly preferred.

These liquid crystalline compounds or polymerizable compounds may be properly selected and combined before being incorporated in the polymerizable liquid crystal composition. In order to at least prevent the resulting polymerizable liquid crystal composition from losing its liquid crystallinity, it is necessary that the added amount of the various components be adjusted.

Further, the polymerizable liquid crystal composition of the present invention may comprise a photoinitiator or photosensitizer incorporated therein for the purpose of enhancing its polymerizability. As the photoinitiator employable herein there may be selected from the group consisting of known benzoinethers, benzophenones, acetophenones, and benzylketals. The added amount of such a photopolymerization initiator is preferably not more than 10% by weight, particularly not more than 5% by weight based on the weight of the polymerizable liquid crystal composition.

The polymerizable liquid crystal composition of the present invention may comprise a stabilizer incorporated therein to stabilize its storage stability. As the stabilizer employable herein there may be properly selected from the group consisting of known hydroquinone, hydroquinonemonoalkylene ethers, and tertiary butyl catechol. The added amount of the stabilizer is preferably not more than 0.05% by weight based on the weight of the polymerizable liquid crystal composition.

Moreover, the polymerizable liquid crystal composition of the present invention can be applied to a novel electron ray or ultraviolet-curing printing ink or coating taking advantage of its liquid crystallinity at room temperature and excellent mechanical strength and heat resistivity after curing. Thus, the polymerizable liquid crystal composition of the present invention may comprise a dye, pigment, dyestuff or the like incorporated therein depending on the purpose.

Thus, the polymerizable liquid crystal composition of the present invention comprises a first kind of monofunctional (meth)acrylate compound as an essential component. As mentioned above, a second kind of monofunctional (meth) acrylate compound, an optically active compound, and other components may be properly combined to obtain various compositions. The term "polymerizable liquid crystal compositions of the present invention" as used hereinafter is meant to include all these compositions unless otherwise specified.

The present invention also provides an optically anisotropic film obtained by the photopolymerization and curing of the foregoing polymerizable liquid crystal composition of the present invention.

The optically anisotropic film of the present invention as used herein means the polymer of the above-mentioned polymerizable liquid crystal composition or the polymer supported on a substrate or clamped between two substrates.

The liquid crystallinity of the polymerizable liquid crystal composition in the vicinity of room temperature makes it possible to be carried out the photopolymerization in the vicinity of room temperature. Therefore, unlike the conventional optically anisotropic films, the optically anisotropic film of the present invention can be obtained without inducing undesirable heat polymerization during the photopolymerization in liquid crystal state so that a uniform orientation can be fixed therein to attain an excellent uniformity. In the present invention, the fixing of uniform orientation of polymerizable liquid crystal composition is achieved by photopolymerization of the liquid crystal. Thus, unlike the conventional optically anisotropic films which are made of a liquid, crystalline polymer compound at glass state, the resulting optically anisotropic film shows an excellent heat resistivity. Further, the optical properties of the optically anisotropic film such as anisotropy of refractive index reflect the optical properties of the polymerizable liquid crystal composition and thus can be easily controlled by controlling the properties of the polymerizable liquid crystal composition.

The first kind of process for the preparation of an optically anisotropic film from the polymerizable liquid crystal composition of the present invention comprises irradiating the foregoing polymerizable liquid crystal composition in aligned state clamped by two sheets of substrates or carried on one sheet of substrate with energy ray such as ultraviolet ray so that it is polymerized and cured. Thus, the use of the foregoing polymerizable liquid crystal composition makes it possible to avoid undesirable heat polymerization. The first kind of preparation process will be further described hereinafter.

Firstly, the preparation process using the substrate which is treated to align the polymerizable liquid crystalline composition such as rubbing of substrate, the formation of an alignment film (organic thin film) on a substrate, or the formation of a deposition film on a substrate will be described hereinafter.

As the substrate there may be used any substrate regardless of whether it is organic or inorganic. Specific examples of organic substrate materials include polyethylene terephthalate, polycarbonate, polyimide, methyl polymethacrylate, polystyrene, polyethylene, polyvinyl chloride, polytetrafluoroethylene, polychlorotrifluoroethylene, polyacrylate, polysulfon, cellulose, and polyether ether ketone. Specific examples of inorganic substrate materials include silicon, and glass.

As the substrate employable in the present invention there may be used a rigid or flexible material. Examples of the rigid material include the foregoing polycarbonate and glass substrates. Examples of the flexible material include transparent film-like materials. The use of a polarizing film as such a substrate makes it possible to integrate the optically anisotropic film therewith. This integrated component is useful as a constituent part of liquid crystal display devices.

As the method for the alignment of the polymerizable liquid crystal composition there may be applied a low molecular liquid crystal alignment method established in the conventional technical field of liquid crystal display (as disclosed in *Ekisho: Ouvouhen (Liquid Crystal: Application)*, Baifukan, Chapter 2) without restriction because the polymerizable liquid crystal composition consists of a low molecular liquid crystal compound.

As the method for aligning the polymerizable liquid crystal composition in a predetermined direction there may be used, e.g., a method which comprises maintaining the polymerizable liquid crystal composition in liquid crystal state clamped by or carried on a substrate which has been rubbed with cloth or the like or a substrate having an alignment film formed by oblique deposition of $SiO_2$. The use of a substrate which has been rubbed with cloth or the like is advantageously simple. If a proper alignment cannot be obtained even by rubbing the substrate with cloth or the like, an organic thin film such as polyimide thin film and polyvinyl alcohol thin film may be formed on the surface of the substrate by any known method before the rubbing with cloth or the like. The positive use of a polyimide thin film as used in ordinary TN or STN cells which provides a pretilt angle can advantageously provide an even accurate control of the internal structure of the optically anisotropic film.

As a method for aligning the polymerizable liquid crystal composition in horizontal to the substrate there may be used a method which comprises the formation of an organic thin film such as polyvinyl alcohol and polyimide thin films on the substrate. A method for the horizontal alignment of the liquid crystal composition without forming such an organic thin film is known. In this case, an organic thin film doesn't need to be formed on the substrate.

As a method for uniaxially aligning the polymerizable liquid crystal composition in horizontal to the substrate there may be used a method which comprises rubbing the substrate as it is or a method which comprises rubbing an organic thin film such as polyvinyl alcohol and polyimide thin film formed on the substrate. Alternatively, a method which comprises obliquely vacuum-depositing $SiO_2$ on the substrate may be applied.

As a method for aligning the polymerizable liquid crystal composition perpendicular to the substrate there may be used a method which comprises forming a thin layer with vertical orientating agent such as lecithin, chromium and a silane coupling agent such as octadecyltriethoxysilane complex on the substrate.

The chiral nematic alignment or cholesteric alignment can be obtained by clamping a polymerizable liquid crystal composition whose helical pitch (P) has been properly adjusted between two sheets of substrates capable of providing horizontal orientation, opposed to each other with a predetermined gap therebetween. Alternatively, it can be obtained by allowing a polymerizable liquid crystal composition whose helical pitch (P) has been properly adjusted to be supported on one sheet of substrate capable of providing horizontal orientation to a predetermined thickness.

The homeotropic alignment can be obtained by clamping a polymerizable liquid crystal composition between two sheets of substrates capable of providing vertical orientation, opposed to each other with a predetermined gap therebetween.

The homogeneous alignment can be obtained by clamping a polymerizable liquid crystal composition between two sheets of rubbed substrates opposed to each other with a predetermined gap therebetween in such an arrangement that the rubbing directions thereof make an angle of 0° or 180°.

The hybrid alignment comprising a continuous change from vertical alignment to horizontal alignment in the thickwise direction can be obtained by clamping a polymerizable liquid crystal composition between a substrate which has been rubbed and a substrate capable of providing vertical orientation, opposed to each other with a predetermined gap therebetween.

As the method for allowing the polymerizable liquid crystal composition to be interposed between the two sheets of substrates there may be used (i) a method which comprises controlling the gap between the two sheets of substrates, and then pouring the polymerizable liquid crystal composition into the gap or (ii) a method which, if a flexible substrate is used, comprises coating the substrate with a mixture of a polymerizable liquid crystal composition and a spacer, and then placing the other substrate on the coated substrate. Examples of the spacer employable herein include myler, alumina, rod type glass fiber, glass beads, and polymer beads. Preferred among these spacers are glass beads. As the method for allowing the polymerizable liquid crystal composition to be supported on one sheet of substrate there may be applied the above method (ii).

Since it is desirable to allow the polymerizable liquid crystal composition to undergo polymerization rapidly, it is preferred to irradiate the polymerizable liquid crystal composition clamped by substrates with energy ray such as ultraviolet ray and electron ray to effect photopolymerization thereof. If the photopolymerization is effected with the polymerizable liquid crystal composition supported between two sheets of substrates, at least the substrate on the irradiation side must be provided with a proper transparency. The temperature at which this process is effected must be such that the polymerizable liquid crystal composition of the present invention can be kept in liquid crystalline state. However, the photopolymerization is effected at a temperature as close to room temperature as possible to avoid undesirable heat polymerization.

While these methods can produce an optically anisotropic film clamped by substrates, the optically anisotropic film of the present invention may be used free of the two substrates or with one or both of the two substrates attached thereto.

If the optically anisotropic film is supported on only one sheet of substrate, a protective layer made of a thermosetting or photo-setting resin may be formed on the surface of the optically anisotropic film for the purpose of protecting the surface of the optically anisotropic film on the side thereof which is not brought into contact with the substrate.

The thickness of the optically anisotropic film thus prepared is preferably in the range of 0.1 to 100 μm, and particularly preferably 0.5 to 50 μm.

If the optically anisotropic film thus prepared is used as an optical compensation film for supertwisted nematic liquid crystal display devices, it is preferably prepared in such a manner that the twist angle is in the range of 30° to 360°, particularly 45° to 270°.

The preparation process comprising the use of electric field as a means of orientating the polymerizable liquid crystal composition clamped by two sheets of substrates will be described hereinafter.

The present invention provides a second kind of preparation process for the preparation of an optically anisotropic film, which comprises (1) a first step of allowing a polymerizable liquid crystal composition to be interposed between a first kind of transparent substrate having an electrically conductive layer and a second kind of substrate with an electrical conductivity, (2) a second step of irradiating the material with light on the first transparent substrate side with a voltage applied across the two substrates, and (3) a third step of peeling said first kind of transparent substrate and said second kind of substrate off the material.

Further, the present invention provides a third kind of preparation process a process for the preparation of an optically anisotropic film, which comprises (1) a first step of allowing a polymerizable liquid crystal composition to be interposed between a first kind of transparent substrate having an electrically conductive layer and a second kind of substrate with an electrical conductivity, (2) a second step of irradiating the material with light on the first kind of transparent substrate side with a voltage applied across the two substrates, and (3) a third step of peeling said second kind of substrate off the material.

Moreover, the present invention provides a fourth kind of preparation process for the preparation of an optically anisotropic film, which comprises (1) a first step of allowing a polymerizable liquid crystal composition to be interposed between two sheets of first kinds of transparent substrates having an electrically conductive layer, and (2) a second step of irradiating the material with light with a voltage applied across the two substrates.

The second, third and fourth kinds of preparation processes will be further described hereinafter.

As the first kind of transparent substrate to be used in the second through fourth kinds of preparation processes there may be preferably used a glass or plastic substrate having an electrically conductive layer. Specific examples of such a substrate include glass substrate with ITO, and plastic substrate with ITO. These substrates with electrical conductivity can be easily obtained by vacuum-deposition, metallization or printing on a glass or plastic substrate having no electrical conductivity. Commercially available substrates with ITO may be used.

As the second kind of substrate employable in the present invention there may be used a transparent or opaque substrate so far as it exhibits electrical conductivity itself, regardless of whether it is organic or inorganic. Specific examples of inorganic substrate materials include metals or oxides thereof, e.g., copper, gold, silver, tin, lead, iron, nickel, aluminum, ITO (indiumtin oxide). Specific examples of organic substrate materials include electrically conductive rubber, and electrically conductive plastic.

As the polymerizable liquid crystal composition there may be used the foregoing polymerizable liquid crystal composition of the present invention to avoid the induction of undesirable heat polymerization during the photopolymerization in liquid crystalline state and thus fix uniform orientation. In order to align the polymerizable liquid crystal composition in an electric field, the anisotropy of the dielectric constant of the composition is preferably positive.

In the process for the preparation of the optically anisotropic film of the present invention, the foregoing first kind of transparent substrate having an electrically conductive layer and second kind of substrate with electrical conductivity are positioned in such an arrangement that a voltage can be applied thereacross with the foregoing polymerizable liquid crystal composition interposed therebetween. As the method for allowing the polymerizable liquid crystal composition to be interposed between the two sheets of substrates there may be used the foregoing method (i) or (ii). In this process, the distance between the two sheets of substrates may be properly adjusted depending on the purpose of the optically anisotropic film thus prepared but is preferably from 0.1 to 100 µm, particularly from 0.5 to 50 µm. In this process, the alignment of the polymerizable liquid crystal composition is controlled by an electric field. Accordingly, the substrate used may or may not have the foregoing oriented film (organic thin film) or a separatable oriented film described later.

Subsequently, the laminate is irradiated with light on the first kind of transparent substrate side with a voltage applied across the two sheets of substrates. As the means of applying a voltage across the substrates there may be used a driving means as used for ordinary liquid crystal display devices. The optimum applied voltage may be properly adjusted depending on the anisotropy in the dielectric constant of the polymerizable liquid crystal composition or the distance between the two substrates but is preferably an AC voltage of not less than 0.5 V.

The photopolymerization is preferably effected by irradiating the foregoing polymerizable liquid crystal composition clamped by the two sheets of substrates with energy ray such as ultraviolet ray and electron ray. Accordingly, at least the substrate on the irradiation side must be provided with a proper transparency. The temperature at which the photopolymerization process is effected must be such that the polymerizable liquid crystal composition of the present invention can be kept in liquid crystal state. However, the photopolymerization is effected at a temperature as close to room temperature as possible to avoid undesirable heat polymerization.

Subsequently, in the second kind of preparation process, an optically anisotropic film of the present invention comprising a polymer layer alone can be easily obtained by peeling the first kind of transparent substrate and the second kind of substrate off the material. In the third kind of preparation process, an optically anisotropic film of the present invention supported on one sheet of substrate can be easily obtained by peeling the second kind of substrate off the material. In the fourth kind of preparation process, an optically anisotropic film clamped by two sheets of substrates can be easily obtained by leaving the first and second kinds of substrates attached to the material.

In the application of the second through fourth kinds of preparation processes, the voltage applied can be controlled every position corresponding to pixel to obtain a photopolymerization product of the foregoing polymerizable liquid crystal composition of the present invention which serves as an optically anisotropic film which has different optical phase retardation from position to position.

Heretofore, the mounting of a color liquid crystal display device on portable devices has a problem that a back light, which is essential to obtain a bright display consuming a large amount of current. In order to solve the problem, Nishino et al. proposed a reflective color liquid crystal display device which requires no back light but utilizes the birefringence of liquid crystal and phase retardation film to provide color display (see *Nikkei Microdevice*, January 1994, page 99).

However, the principle of this approach is disadvantageous in that the increase in the number of colors requires the lamination of a plurality of phase retardation films that causes the loss in the light transmittance, making it difficult to provide a bright display.

On the other hand, the optically anisotropic film prepared according to the present invention is a single-sheet optically anisotropic film having different optical phase retardation from position to position corresponding to pixel in the liquid crystal display device. Thus, the optically anisotropic film of the present invention can provide color display regardless of the balance between the number of colors and the light transmittance.

The optically anisotropic film of the present invention is a photopolymerization product of a polymerizable liquid crystal composition which differs in optical phase retardation from position to position. The process for the preparation of such an optically anisotropic film is the same as the second through fourth kinds of preparation processes except that the electric field is controlled every pixel.

The optically anisotropic film of the present invention can be prepared by irradiating the polymerizable liquid crystal composition with energy ray such as ultraviolet ray and electron ray while the voltage applied is being controlled every position corresponding to pixel in the liquid crystal display device so that the alignment of the polymerizable liquid crystal composition is varied, so that the alignment is fixed therein. The present invention provides the following three embodiments of the preparation process:

(Fifth kind of preparation process)

A process for the preparation of an optically anisotropic film, which comprises:
(1) a first step of allowing a polymerizable liquid crystal composition to be interposed between a first kind of transparent substrate which is treated to align the liquid crystal having an electrode layer and a second kind of substrate which is treated to align the liquid crystal having an electrode layer;
(2) a second step of irradiating the material with light on the first kind of transparent substrate side with the voltage applied across the two sheets of substrates being controlled every pixel; and
(3) a third step of peeling both the first kind of transparent substrate and the second kind of substrate off the material.

(Sixth kind of preparation process)

A process for the preparation of an optically anisotropic film, which comprises:
(1) a first step of allowing a polymerizable liquid crystal composition to be interposed between a first kind of transparent substrate with an electrode layer which is treated to align the liquid crystal and a second kind of substrate having an electrode layer;
(2) a second step of irradiating the material with light on the first kind of transparent substrate side with the voltage applied across the two sheets of substrates being controlled every pixel; and
(3) a third step of peeling the second kind of substrate off the material.

(Seventh kind of preparation process)

A process for the preparation of an optically anisotropic film, which comprises:
(1) a first step of allowing a polymerizable liquid crystal composition to be interposed between two sheets of transparent substrates having an electrode layer which is treated to align the liquid crystal; and
(2) a second step of irradiating the material with light with the voltage applied across the two sheets of substrates being controlled every pixel.

In the fifth through seventh kinds of preparation processes, a polymerizable liquid crystal composition is interposed between two sheets of substrates having an electrode layer which is treated to align the liquid crystal.

One of the substrates is then covered by a mask that allows only the portion corresponding to desired pixels to transmit energy ray. The material is then irradiated with energy ray with a predetermined voltage being applied across the two sheets of substrates so that the alignment determined by the predetermined voltage is fixed. The mask is then removed from the material. The material is then irradiated with energy ray on the entire surface, including the unirradiated area, with the voltage applied across the two sheets of substrates being varied depending on the portion corresponding to pixels. Thus, an optically anisotropic film having different alignment states fixed therein depending on the predetermined voltage can be prepared.

The fifth through seventh kinds of preparation processes will be further described hereinafter.

In the present invention, the first kind of transparent substrate which is treated to align the liquid crystal having an electrode layer and the second kind of substrate having an electrode layer (in the fifth and sixth kinds of preparation processes) which is treated to align the liquid crystal or two sheets of transparent substrates having an electrode layer (in the seventh kind of preparation process) are positioned in such an arrangement that a voltage can be applied across thereacross with the foregoing polymerizable liquid crystal composition being interposed therebetween.

As the transparent substrate to be used herein there should be used a substrate having an electrode layer. Specific examples of such a substrate include glass substrate with ITO, and plastic substrate with ITO. These substrates are preferably treated to align the liquid crystal. Examples of such treatments include rubbing of the surface of the substrate with cloth or the like, and oblique vacuum deposition of $SiO_2$. Rubbing is advantageously simple. If a proper alignment cannot be obtained even by rubbing the surface of the substrate with cloth or the like, an organic thin film such as polyimide thin film or polyvinyl alcohol thin film may be formed on the surface of the substrate by a known method before rubbing with cloth or the like. Alternatively, a separatable film which is treated to align the liquid crystal may be formed on the surface of the substrate as described later.

Subsequently, the material is irradiated with light on the transparent substrate side while the voltage applied across the two sheets of substrates being controlled every pixel. As a method for applying a voltage across the electrode layers there may be used a static driving or time shearing addressing method for use in ordinary liquid crystal display devices. The optimum applied voltage may be properly adjusted depending on the anisotropy of the dielectric constant of the polymerizable liquid crystal composition or the distance between the two substrates but is preferably an AC voltage of not less than 0.5 V.

In the preparation of the optically anisotropic film, if the alignment of the polymerizable liquid crystal composition is partially controlled by an electric field, the anisotropy of the dielectric constant of the polymerizable liquid crystal composition is preferably positive. In particular, the anisotropy $\Delta\epsilon$ in dielectric constant is preferably not less than 0.5. In order to obtain such a polymerizable liquid crystal composition, first and second kinds of monofunctional (meth)acrylate compounds containing cyano group are preferably incorporated in the composition.

The photopolymerization is preferably effected by irradiating the foregoing polymerizable liquid crystal composition clamped by the two sheets of substrates with energy ray such as ultraviolet ray and electron ray. Accordingly, at least the substrate on the irradiation side must be provided with a proper transparency. The temperature at which the photopolymerization process is effected must be such that the polymerizable liquid crystal composition of the present invention can be kept in liquid crystalline state. However, the photopolymerization is effected at a temperature as close to room temperature as possible to avoid undesirable heat polymerization.

Therefore, if the photopolymerization process is effected with the polymerizable liquid crystal composition being clamped by two sheets of substrates, at least the substrate on the irradiation side must be provided with a proper transparency.

Subsequently, one or both of the two sheets of substrates which have been used in the preparation of the optically anisotropic film are peeled off the material depending on the purpose as mentioned above.

The optical phase retardation in the optically anisotropic film of the present invention varies depending on the position corresponding to pixel but is preferably in the range of 0 to 1.8 $\mu$m, more preferably 0 to 1.2 $\mu$m. The shape and size of the portion corresponding to a pixel having a uniform retardation can be quite freely determined and can be properly selected from the group consisting of minute rectangular pixel having a side of about 60 $\mu$m, and patterns such as circle, triangle and other designs having a size of scores of centimeters depending on the purpose.

The thickness of the polymer layer in the optically anisotropic film of the present invention is preferably in the range of 0.1 to 100 $\mu$m, particularly 0.5 to 50 $\mu$m. The optically anisotropic film of the present invention may consist of the foregoing polymer layer singly or supported on a transparent substrate or clamped by two sheets of transparent substrates.

For the purpose of protecting the surface of the optically anisotropic film of the present invention as proposed above, a protective layer made of thermo-setting or photo-setting resin may be formed on the surface of the optically anisotropic film.

A transparent electrode made of ITO or the like may be formed on the surface of the optically anisotropic film of the present invention so that the optically anisotropic film can be used as-a constituent part of liquid crystal cell. In this arrangement, a protective layer made of a heat resistant thermo-setting or photo-setting resin is preferably formed on the surface of the optically anisotropic film to prevent the optically anisotropic film from being damaged by heat or the like during the formation of ITO electrode.

In another embodiment of the method for varying the orientation of the polymerizable liquid crystal composition every portion corresponding to pixel in the liquid crystal display device, the polymerizable liquid crystal composition is clamped by two sheets of substrates. One of the substrates is then covered by a mask which allows only the portion corresponding to desired pixels to transmit energy ray.

The polymerizable liquid crystal composition is then irradiated with energy ray while being aligned in a magnetic field having an arbitrary direction and intensity so that the alignment determined by magnetic field is fixed therein. Further, the unirradiated area is similarly irradiated with energy ray while the intensity and direction of magnetic field being varied. Thus, an optically anisotropic film having different alignment states fixed therein depending on the portion corresponding to pixel can be prepared.

If the orientation of the polymerizable liquid crystal composition is fixed by the application of magnetic field, it is not necessary that the substrates be provided with an electrode layer. As the substrate there may be any substrate material regardless of whether it is organic or inorganic. Examples of the substrate material employable herein are as described above.

The alignment structure of the polymerizable liquid crystal composition at the area to which an external field such as electric field and magnetic field is not applied depends on how the substrate is oriented and the concentration of the optically active compound in the polymerizable liquid crystal composition. The alignment structure preferably exhibits a proper alignment state selected depending on the purpose of the optically anisotropic film. Specific examples of the alignment structure include the foregoing horizontal alignment, vertical alignment, chiral nematic alignment, cholesteric alignment, homeotropic alignment, homogeneous alignment, and hybrid alignment.

As mentioned above, the combination of alignment by an external field such as electric field and magnetic field and process for the orientation of substrate makes it possible to partially change the alignment of the polymerizable liquid crystal composition.

The foregoing preparation process makes it possible to obtain an optically anisotropic film of the present invention comprising a polymer layer having partially different orientation structure fixed therein.

It has been found that, in the first, second, third, fifth and sixth kinds of preparation processes which comprise the photopolymerization of a polymerizable liquid crystal composition clamped by two sheets of substrates, and then peeling at least one of the substrates off the material, the poor peelability of the substrate can be eliminated for the enhancement of the yield of the optically anisotropic film by providing the oriented film with a good peelability with respect to the optically anisotropic film.

In order to make the substrate peelable, a thin film of an organic material is preferably formed on the surface of the substrate to provide the substrate with a good peelability. Examples of the organic material include fluorinated polymer such as polytetrafluoroethylene, and lecithin. However, in the present invention, an alignment film-forming composition made of a polyvinyl alcohol and a dihydroxy compound represented by the following general formula (IV):

$$HO-R^3-OH \qquad (IV)$$

wherein $R^3$ represents a $C_{6-16}$ divalent organic group is preferably used for the substrate.

Heretofore, polyvinyl alcohols have been used as alignment films for liquid crystal. The alignment film-forming composition of the present invention comprises a dihydroxy compound represented by the general formula (IV) as well as polyvinyl alcohol. This feature provides the substrate with a good peelability with respect to the optically anisotropic film.

The present invention will be further described hereinafter.

The alignment film-forming composition of the present invention is dissolved in a solvent, applied to a glass substrate or plastic substrate, and then dried to form a thin film on the substrate. The thin film thus formed is then rubbed. Thus, the thin film can be used as an alignment film for providing the liquid crystal with an alignment in horizontal to the substrate. This alignment film can provide the liquid crystal with a uniform and stable orientation and provide the substrate with a good peelability with respect to the optically anisotropic film. The reason why such a good peelability can be obtained is unknown. This is possibly because that the dihydroxy compound of the general formula (IV) exhibits a very small adhesivity to a glass substrate or plastic substrate.

As the polyvinyl alcohol to be contained in the alignment film-forming composition there may be preferably used any polyvinyl alcohol which is normally solid at room temperature, regardless of its polymerization degree, to provide the liquid crystal with a stable alignment. The polymerization degree of the polyvinyl alcohol is preferably not less than 500.

Examples of the dihydroxy compound represented by the general formula (IV) to be contained in the alignment film-forming composition include 1,6-hexanediol, 1,5-hexanediol, 1,7-heptanediol, 1,2-octanediol, 1,8-octanediol, 1,9-nonanediol, 1,2-decanediol, 1,10-decanediol, 1,2-dodecanediol, 1,12-dodecanediol, 1,2-tetradecanediol, 1,14-tetradecanediol, 1,2-hexadecanediol, 1,16-hexadecanediol, and 1,4-cyclohexanedimethanol. These dihydroxy compounds represented by the general formula (IV) can be used singly or in combination.

The proportion of polyvinyl alcohol in the alignment film-forming composition is preferably in the range of 30 to 95% by weight. If this proportion falls below this range, the dihydroxy compound of the general formula (IV) crystallizes, making it impossible to obtain a good alignment. On the other hand, if this proportion exceeds this range, there occurs a tendency to make it impossible to provide the substrate with a good peelability.

The process which comprises dissolving the alignment film-forming composition in a solvent, applying the solution to the substrate which is to be peeled, drying the material so that the solvent is dried out, and then rubbing the film formed on the substrate to obtain an alignment film will be further described hereinafter. - As the solvent for dissolving the alignment film-forming composition there may be used any solvent which is commonly recognized as a polar solvent in the art without restriction. From the standpoint of dryability, water, methanol, ethanol, or mixture thereof are particularly preferred. The concentration of the solution of the alignment film-forming composition in such a solvent is preferably in the range of 1 to 20% by weight. The alignment film-forming composition solution may be applied to a glass substrate or plastic substrate by a method such as roll coater method, spin coater method and printing method. As the method for drying up the solvent after coating there may be used natural drying, heat drying, drying under reduced pressure or the like, singly or in combination. Whatever is the drying method, the film of alignment film-forming composition thus dried is preferably heated to a temperature of 80° to 150° C. This heating causes the dihydroxy compound of the general formula (IV) to be uniformly dispersed in the high molecular chain of polyvinyl alcohol, making it possible to obtain a uniform film free from the deposition of dihydroxy compound. The film thus heated is then allowed to cool to room temperature. The film thus formed can then be subjected to rubbing by rayon or nylon cloth to obtain an alignment film which provides the liquid crystal with a uniform alignment and provides the substrate with a good peelability with respect to the optically anisotropic film.

The process for the preparation of an optically anisotropic film from the foregoing alignment film-forming composition will be further described hereinafter.

The alignment film made of alignment film-forming composition may be formed on only one or both of the two sheets of substrates to be used in the preparation process of the present invention. In this case, the other substrate to be opposed to the one of the two sheets of substrates may have been subjected to rubbing as it is or after the formation of an alignment film thereon. In the case where an alignment film is formed on the other substrate, any material which is commonly recognized as an alignment film-forming material in the art may be used without restriction. For example, the foregoing polyimide or polyvinyl alcohol film may be subjected to rubbing to form the desired alignment film.

After the photopolymerization, the substrate of the present invention on which an alignment film having a good peelability has been formed can be peeled off the resulting polymer to prepare an optically anisotropic film of the present invention. If the substrate is peeled off the optically anisotropic film, it can be easily effected mechanically. In this process, the substrate may be dipped in a poor solvent for both the optically anisotropic film and substrate.

Besides these processes, processes for the preparation of the optically anisotropic film according to the first, third and sixth kinds of preparation processes of the present invention at lower cost may be used. These processes will be described hereinafter.

It has been found that the relaxation of many requirements for transparent substrate constituting an optically anisotropic film supported on one sheet of substrate for the reduction of production cost can be accomplished by using properly (i) a substrate necessary for the alignment of the polymerizable liquid crystal composition, and (ii) a substrate for supporting the resulting optically anisotropic film. Thus, the present invention has been worked out.

The present invention provides an eighth kind of preparation process for the preparation of an optically anisotropic film, which comprises:

(1) a first step of subjecting a first kind of transparent substrate and a second kind of substrate which is treated to align the liquid crystal;

(2) a second step of positioning said two sheets of substrates with the oriented surface thereof being opposed to each other and then allowing a polymerizable liquid crystal composition to be interposed therebetween;

(3) a third step of irradiating the material with light so that said polymerizable liquid crystal composition is polymerized to form an optically anisotropic film;

(4) a fourth step of peeling one of the two sheets of substrates off the material; and (5) a fifth step of transferring said optically anisotropic film to a third kind of transparent substrate.

The present invention provides a ninth kind of preparation process for the preparation of an optically anisotropic film, which comprises:

(1) a first step of allowing a polymerizable liquid crystal composition to be interposed between a first kind of transparent substrate having an electrically conductive layer and a second kind of electrically conductive substrate;

(2) a second step of irradiating the material with light on the first kind of transparent substrate side with a voltage being applied across said two sheets of substrates so that said polymerizable liquid crystal composition is polymerized to form an optically anisotropic film;

(3) a third step of peeling one of the two sheets of substrates off the material; and (4) a fourth step of transferring said optically anisotropic film to a third kind of transparent substrate.

The eighth and ninth kinds of preparation processes will be further described hereinafter.

As the substrate to be used in the eighth kind of preparation process there may be used any substrate material regardless of whether it is organic or inorganic. Such a substrate doesn't have to exhibit an optical isotropy. As such a substrate material there may be used the same material as used in the first kind of preparation process. The two sheets of substrates may be different. However, at least one of the two sheets of substrates must be provided with a proper transparency to effect the desired photopolymerization.

In the eighth kind of preparation process, it is necessary that the surface of the substrate is treated to align the liquid crystal. As the method for the orientation of the substrate there may be applied a method which comprises rubbing the substrate with cloth or the like or a method which comprises the orientation of a low molecular liquid crystal as established in the conventional technical field of liquid crystal display (see *Ekisho: Oyohen (Liquid Crystal: Application)*, Baifukan, Chapter 2), without restriction.

The alignment structure preferably exhibits a proper alignment state selected depending on the purpose of the optically anisotropic film. Specific examples of the alignment structure include the foregoing horizontal alignment, vertical alignment, chiral nematic alignment, cholesteric alignment, homeotropic alignment, homogeneous alignment, and hybrid alignment.

The substrate which is treated to align the liquid crystal is preferably provided with a proper peelability with respect to the optically anisotropic film taking into account the step of transferring the optically anisotropic film to the third kind of transparent substrate. Examples of such a substrate material include rubbed substrate made of fluorinated polymer such as polytetrafluoroethylene, and substrate obtained by applying a mixture of a polyvinyl alcohol and a diol compound such as 1,8-octanediol to a substrate, drying the material, and then rubbing the material.

As the first kind of transparent substrate to be used in the ninth kind of preparation process of the present invention there may be preferably used a glass or plastic substrate having an electrically conductive layer. Specific examples of such a substrate include glass substrate with ITO, and plastic substrate with ITO. These substrates can be easily obtained by vacuum-deposition, metallization or printing on a glass or plastic substrate having no electrical conductivity. Commercially available substrates with ITO may be used.

As the second kind of substrate employable in the present invention there may be used a transparent or opaque substrate so far as it exhibits electrical conductivity itself, regardless of whether it is organic or inorganic. Specific examples of inorganic substrate materials include metals or oxides thereof, e.g., copper, gold, silver, tin, lead, iron, nickel, aluminum, ITO (indiumtin oxide). Specific examples of organic substrate materials include electrically conductive rubber, and electrically conductive plastic.

As the third kind of transparent substrate to be used in the eighth and ninth kinds of preparation processes of the present invention there may be preferably used a substrate having transparency and optical isotropy at the same time. However, it doesn't have to exhibit orientability. Examples of such a transparent substrate include glass substrate, and plastic substrate such as polymethyl methacrylate, polyethylene, polyether sulfon, polyacrylate, amorphous polyolefin and cellulose. As another transparent substrate there may be used a polarizing film. The use of such an optically anisotropic film advantageously can reduce the trouble of separately applying the optically anisotropic film and the polarizing film in the preparation of liquid crystal display.

In the eighth kind of preparation process, the substrates which are treated to align the liquid crystal are positioned opposed to each other. In the ninth kind of preparation process, two sheets of substrates are positioned in such an arrangement that a voltage can be applied thereacross. Subsequently, the foregoing polymerizable liquid crystal composition is positioned interposed between the two sheets of substrates. In this process, the distance between the two sheets of substrates may be properly adjusted depending on the purpose of the optically anisotropic film thus prepared but is preferably in the range of 0.1 to 100 μm, particularly 0.5 to 50 μm.

In one embodiment of the eighth kind of preparation process, the polymerizable liquid crystal composition may be supported on one sheet of substrate which has been oriented. In this case, the thickness of the polymerizable liquid crystal composition is preferably in the same range as used hereinabove.

Subsequently, in the eighth kind of preparation process, the material is irradiated with light so that the polymerizable liquid crystal composition is polymerized. In the ninth kind of preparation process, the material is irradiated with light on the first kind of transparent substrate side with a voltage being applied across the two sheets of substrates to effect the polymerization thereof in the same manner as above. As a method for applying a voltage across the two sheets of substrates there may be used a driving means as commonly used in ordinary liquid crystal display devices. The optimum applied voltage may be properly adjusted depending on the anisotropy of the dielectric constant of the polymerizable liquid crystal composition or the distance between the two sheets of substrates but is preferably an AC voltage of not less than 0.5 V.

In the eighth and ninth kinds of preparation processes, the photopolymerization is preferably effected by irradiating the foregoing polymerizable liquid crystal composition clamped by the two sheets of substrates with energy ray such as ultraviolet ray and electron ray. Accordingly, at least the substrate on the irradiation side must be provided with a proper transparency. The temperature at which the photopolymerization process is effected must be such that the polymerizable liquid crystal composition of the present invention can be kept in liquid crystal state. However, the photopolymerization is effected at a temperature as close to room temperature as possible to avoid undesirable heat polymerization.

In the eighth and ninth kinds 6f preparation processes, one of the two sheets of substrates must be peeled off the optically anisotropic film obtained by the photopolymerization of the polymerizable liquid crystal composition. A protective layer made of a thermo-setting or photo-setting resin may be formed on the exposed surface of the optically anisotropic film to protect the surface of the optically anisotropic film.

The step of transferring the optically anisotropic film supported on the substrate thus obtained to a third kind of transparent substrate will be described hereinafter.

The term "step of transferring the optically anisotropic film" as used herein is meant to indicate a step of applying a third kind of transparent substrate to the surface of the optically anisotropic film supported on one of the first and second kinds of substrates with an adhesive, and then peeling only the first or second kind of substrate off the material to prepare a substrate having only an optically anisotropic film supported on the third kind of transparent substrate of the present invention.

As the adhesive with which the transparent substrate is applied to the optically anisotropic film there may be used any adhesive of optical grade without restriction. For example, acrylic, epoxy, rubber and ethylene-vinyl acetate copolymer adhesives may be used.

The optically anisotropic film of the present invention prepared from various polymerizable liquid crystal compositions by respective proper preparation process can be used as phase retardation plate or alignment film for optical display devices, particularly liquid crystal display devices.

An optically anisotropic film prepared by the photopolymerization and curing with a dichroic dye can be used as a polarizing plate.

The liquid crystal display device comprising such an optically anisotropic film will be further described hereinafter. Examples of the optically anisotropic film to be incorporated in the liquid crystal display device of the present invention include one comprising a polymer layer clamped by the-two sheets of transparent substrates used in the preparation of the optically anisotropic film, one comprising a polymer layer supported on one sheet of transparent substrate, and one prepared by peeling at least one of the two sheets of substrates off the polymerizable liquid crystal composition, and then transferring the material to a third kind of transparent substrate. Examples of the liquid crystal display device which can be combined with these optically anisotropic films include twisted nematic, supertwisted nematic, phase change type, guest-host type, and ferroelectric liquid crystal display devices. Further, a liquid crystal display device having a polymer-dispersion light controlling layer, e.g., NCAP, PDLC may be used. As the light controlling layer there may be used a polymer network type liquid crystal display device (PN-LCD) comprising a transparent solid substance arranged in a three-dimensional network structure which requires a low driving voltage. The method for driving these liquid crystal display devices may be preferably selected depending on the kind of the liquid crystal display device. The twisted nematic or high polymer-dispersion type liquid crystal display device can be advantageously driven by an active element such as TFT (thin film transistor) in the light of display capacity.

The structure of the liquid crystal display device of the present invention will be described hereinafter.

The liquid crystal display device of the present invention normally comprises the foregoing optically anisotropic film and two sheets of polarizing plates. The optically anisotropic film is normally positioned interposed between the polarizing plate and a liquid crystal cell. The foregoing optically anisotropic film having an electrode layer may be positioned in the liquid crystal cell.

In the liquid crystal display device of the present invention, one of the two sheets of polarizing plates may be replaced by a reflective plate. If such a reflective plate is used, one of the electrode surfaces of the liquid crystal display device can be advantageously designed to serve also as a reflective plate to improve the parallax of the liquid crystal display device.

The angle made by the axis of polarization of the polarizing plate and the optical axis of the optically anisotropic film may be properly adjusted depending on the liquid crystal display device thus formed but is preferably 45°. If two sheets of polarizing plates are used, they are preferably positioned in such an arrangement that the axis of polarization thereof are in parallel to or perpendicular to each other in the light of contrast.

The liquid crystal display device of the present invention may be provided with a commonly used micro color filter to improve the purity of colors developed according to optical phase retardation.

The present invention will be further described in the following examples, but the present invention should not be construed as being limited thereto.

EXAMPLE 1

A polymerizable liquid crystal composition (A) made of 50 parts by weight of a compound represented by formula (a):

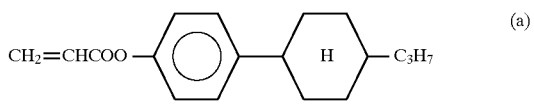

and 50 parts by weight of a compound represented by formula (c):

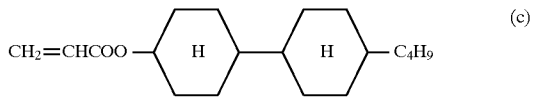

was prepared. The composition thus obtained exhibited a nematic phase at room temperature. The phase transition temperature from nematic phase to isotropic liquid phase was 55°C.

EXAMPLE 2

A polymerizable liquid crystal composition (B) made of 60 parts by weight of the compound represented by formula (a) and 40 parts by weight of the compound represented by formula (c) was prepared. The composition thus obtained exhibited a nematic phase at room temperature. The phase transition temperature from nematic phase to isotropic liquid phase was 49° C.

EXAMPLE 3

A polymerizable liquid crystal composition (C) made of 20 parts by weight of the compound represented by formula (a) and 10 parts by weight of the compound represented by formula (c) was prepared. The composition thus obtained exhibited a nematic phase at room temperature. The phase transition temperature from nematic phase to isotropic liquid phase was 44° C.

EXAMPLE 4

A polymerizable liquid crystal composition (D) made of 10 parts by weight of the compound represented by formula (a), 10 parts by weight of the compound represented by formula (c) and 10 parts by weight of a compound represented by formula (d):

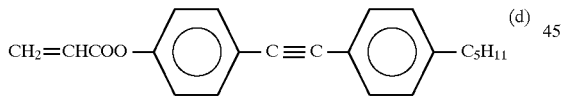

was prepared. The composition thus obtained exhibited a nematic phase at room temperature. The phase transition temperature from nematic phase to isotropic liquid phase was 49° C. Refractive indices at 25° C. of extraordinary light ($n_e$) and ordinary light ($n_o$) are 1.61 and 1.50, respectively.

EXAMPLE 5

A polymerizable liquid crystal composition (D-1) made of 100 parts by weight of the liquid crystal composition (D) obtained in Example 4 and 2 parts by weight of a photoinitiator "IRG-651" (available from Ciba Geigy) was obtained. A glass substrate having a rubbed polyimide-alignment film and a rubbed polycarbonate substrate were positioned with the rubbed surface thereof being opposed to each other in such an arrangement that the rubbing direction of the two substrates make an angle of 90° to prepare a TN structure cell having a gap of 20 μm. Into the cell was then poured the polymerizable liquid crystal composition (D-1). The cell was positioned between two sheets of polarizing plates which cross each other to confirm the orientation thereof. As a result, it was found that uniform alignment of TN structure had been obtained.

Subsequently, the cell was passed under an ultraviolet ray (metal halide lamp with 80 W) twice at a rate of 10 m/sec. at room temperature so that it was irradiated with ultraviolet ray having an energy of 350 mJ/cm$^2$ to cause the polymerizable liquid crystal composition to be cured. The polycarbonate substrate was then peeled off the polymer thus obtained to obtain an optically anisotropic film supported on the glass substrate. The optically anisotropic film thus obtained exhibited a high mechanical strength. The glass substrate on which the optically anisotropic film had been supported was then positioned between two sheets of polarizing plates which cross each other to confirm the orientation thereof. As a result, it was found that the optically anisotropic film had maintained uniform alignment of TN structure and had no nonuniformity even after curing by ultraviolet ray. Even when heated to a temperature of 200° C., the optically anisotropic film maintained TN structure, showing an excellent heat resistivity.

EXAMPLE 6

An optically anisotropic film was obtained in the same manner as in Example 5 except that the polycarbonate substrate to be used as the opposing substrate was replaced by a polytetrafluoroethylene substrate. The optically anisotropic film thus obtained maintained uniform alignment of TN structure and had no nonuniformity. Similarly to Example 5, even when heated to a temperature of 200° C., the optically anisotropic film maintained TN structure, showing an excellent heat resistivity.

EXAMPLE 7

A polymerizable liquid crystal composition (E) made of 50 parts by weight of the compound represented by formula (a) and 50 parts by weight of the compound represented by formula (d) was prepared. The composition thus obtained exhibited a nematic phase at room temperature. The phase transition temperature from nematic phase to isotropic liquid phase was 47° C. Refractive indices at 25° C. of extraordinary light ($n_e$) and ordinary light ($n_o$) are 1.65 and 1.52, respectively.

EXAMPLE 8

A polymerizable liquid crystal composition (E-1) having a helical pitch of 15.0 μm made of 100 parts by weight of the liquid crystal composition (E) obtained in Example 7, 2 parts by weight of a photoinitiator "IRG-651" (available from Ciba Geigy), and 0.49 parts by weight of a chiral compound "R-811" (available from Merck & Co.) which induces a right-handed helical structure was obtained. The polymerizable liquid crystal composition thus obtained was then poured into an STN cell made of a glass substrate having a rubbed polyimide-oriented film with a cell gap of 10.0 μm and a twist angle of 240° with right-handed direction. The STN cell thus obtained was then passed under ultraviolet ray (metal halide lamp with 80 W) twice at a rate of 10 m/min. at room temperature so that it was irradiated with ultraviolet ray having an energy of 350 mJ/cm$^2$ to cause the polymerizable liquid crystal composition to be cured. One of the two sheets of glass substrates was then peeled off the polymer thus obtained to obtain an optically anisotropic film having a 240° of right-handed helical structure supported on one glass substrate. The product (Δn·d) of the anisotropy (Δn) of the refractive index of the optically anisotropic film thus obtained and the thickness (d) of the optically anisotropic film was 0.85 μm.

A nonpolymerizable liquid crystal composition (M) with a helical-pitch of 11.1 μm made of 100 parts by weight of a liquid crystal composition "ZLI-1132" (available from Merck & Co.) and 1 part by weight of cholesterol pelargonate as a chiral compound which induces a left-handed helical structure was obtained. The nonpolymerizable liquid crystal composition (M) thus obtained was then poured into an STN cell made of a glass substrate with a transparent electrode having a rubbed polyimide-alignment film with a cell gap of 6.2 μm and a twist angle of 240° with left-handed direction. The optically anisotropic film was then put on the STN cell. The material was then clamped by two sheets of polarizing plates which cross each other to prepare a liquid crystal display device. In this. arrangement, the STN cell was brought into contact with the glass substrate on which the optically anisotropic film had been supported, and the rubbing direction of the glass substrate on which the optically anisotropic film had been supported and the rubbing direction of the glass substrate of the STN cell in contact with the glass substrate on which the optically anisotropic film had been supported made right angle. When a voltage was applied across the transparent electrodes on the liquid crystal display device, a black-and-white display which is uniform over a wide temperature range was provided. The liquid crystal display device also exhibited excellent viewing angle properties.

EXAMPLE 9

A polymerizable liquid crystal composition (E-2) made of 100 parts by weight of the liquid crystal composition (E) obtained in Example 7 and 1 part by weight of the photoinitiator "IRG-651" was obtained. A glass substrate having a rubbed polyimide-alignment film and a rubbed polycarbpnate substrate were positioned with the rubbed surface thereof being opposed to each other in such an arrangement that the rubbing direction of the two substrates make an angle of 45° to prepare a twisted nematic structure cell having a gap of 4 μm and a twist angle of 45°. Into the cell was then poured the polymerizable liquid crystal composition (E-2). The cell was positioned between two sheets of polarizing plates to confirm the orientation thereof. As a result, it was found that uniform orientation of 45° twisted nematic structure had been obtained.

Subsequently, the cell was passed under an ultraviolet ray (metal halide lamp with 80 W) twice at a rate of 10 m/sec. at room temperature so that it was irradiated with ultraviolet ray having an energy of 350 mJ/cm² to cause the polymerizable liquid crystal composition to be cured. The polycarbonate substrate was then peeled off the polymer thus obtained to obtain an optically anisotropic film supported on the glass substrate. The optically anisotropic film thus obtained exhibited a high mechanical strength. The glass substrate on which the optically anisotropic film had been supported was then positioned between two sheets of polarizing plates which cross each other to confirm the orientation thereof. As a result, it was found that the optically anisotropic film had maintained uniform alignment of twisted nematic structure and had no nonuniformity even after curing by ultraviolet ray. Even when heated to a temperature of 200° C., the optically anisotropic film maintained 45° twisted nematic structure, showing an excellent heat resistivity.

EXAMPLE 10

A rubbed polytetrafluoroethylene substrate and a rubbed polycarbonate substrate were positioned with the rubbed surface thereof being opposed to each other in such an arrangement that the rubbing direction of the two substrates make an angle of 85° to prepare a twisted nematic structure cell having a gap of 4 μm and a twist angle of 85°. Into the cell was then poured the same polymerizable liquid crystal composition (E-2) as used in Example 9. Subsequently, the cell was passed under an ultraviolet ray (metal halide lamp with 80 W) twice at a rate of 10 m/sec. at room temperature so that it was irradiated with ultraviolet ray having an energy of 350 mJ/cm² to cause the polymerizable liquid crystal composition to be cured. The polytetrafluoroethylene substrate was then peeled off the polymer thus obtained to obtain an optically anisotropic film supported on the polycarbonate substrate. The optically anisotropic film thus obtained exhibited a high mechanical strength. The -polycarbonate substrate on which the optically anisotropic film had been supported was then positioned between two sheets of polarizing plates to confirm the orientation thereof. As a result, it was found that the cell had maintained uniform orientation of 85° twisted nematic structure and had no nonuniformity even after curing by ultraviolet ray. Even when heated to a temperature of 100° C., the optically anisotropic film maintained 85° twisted nematic structure, showing an excellent heat resistivity.

EXAMPLE 11

A polyvinyl alcohol was applied to a polarizing film. The polarizing film thus coated was then rubbed in the direction with which the axis of transmission of the polarizing film substrate forms an angle of 45°. The polarizing film thus obtained and a rubbed polycarbonate substrate were positioned with the rubbed surface thereof being opposed to each other in such an arrangement that the rubbing direction of the two substrates make an angle of 85° to prepare a twisted nematic structure cell having a gap of 4 μm and a twist angle of 85°. Into the cell was then poured the same polymerizable liquid crystal composition (E-2) as used in Example 9. Subsequently, the cell was passed under an ultraviolet ray (metal halide lamp with 80 W) twice at a rate of 10 m/sec. at room temperature so that it was irradiated with ultraviolet ray having an energy of 350 MJ/cm² to cause the polymerizable liquid crystal composition to be cured. The polycarbonate substrate was then peeled off the polymer thus obtained to obtain an optically anisotropic film supported on the polarizing film substrate. The optically anisotropic film thus obtained served as a uniform ellipsoidal polarizing plate. Even when heated to a temperature of 100° C., the optically anisotropic film maintained 85° twisted nematic structure, showing an excellent heat resistivity.

EXAMPLE 12

A polyvinyl alcohol was applied to a polarizing film substrate. The polarizing film thus coated was then rubbed in the direction with which the axis of transmission of the polarizing film substrate forms an angle of 30°. The polarizing film thus obtained and a rubbed polycarbonate substrate were positioned with the rubbed surface thereof being opposed to each other with a gap of 10.0 μm in such an arrangement that the rubbing direction of the two substrates make an angle of 240° with right-handed direction to prepare a twisted nematic structure cell. Into the cell was then poured the same polymerizable liquid crystal composition (E-1) as used in Example 8. Subsequently, the cell was then irradiated with ultraviolet ray of 200 mJ/cm² from an ultraviolet lamp (UVGL-25 available from UVP) on the polycarbonate substrate side to cause the polymerizable liquid crystal composition to be cured. The polycarbonate substrate was then peeled off the polymer thus obtained to obtain an optically anisotropic film having a 240° of right-handed helical structure supported on the polarizing film substrate.

The nonpolymerizable liquid crystal composition (M) obtained in Example 8 was then poured into an STN cell made of two sheets of glass substrates with a transparent electrode having a rubbed polyimide-alignment film with a cell gap of 6.2 μm and a twist angle of 240° of the left-handed direction. The STN cell was then clamped between a sheet of polarizing film and the polarizing film on which the optically anisotropic film had been supported to prepare a liquid crystal display device. In this arrangement, the STN cell was brought into contact with the optically anisotropic film supported on the polarizing film, and the angle made by the axis of transmission of the polarizing film and the rubbing direction of the glass substrate of the STN cell was the same as in Example 8. When a voltage was applied across the transparent electrodes on the liquid crystal display device, a black-and-white display which is uniform over a wide temperature range was-provided. The liquid crystal display device also exhibited excellent viewing angle properties.

EXAMPLE 13

A polyvinyl alcohol was applied to a polarizing film substrate. The polarizing film thus coated was then rubbed in the direction with which the axis of transmission of the polarizing film substrate forms an angle of 30°. A mixture of the polymerizable liquid crystal composition (E-1) obtained in Example 8 and glass bead spacers having a diameter of 10.0 μm was then applied to the rubbed surface of the polarizing film substrate by means of a dispenser. A rubbed polycarbonate substrate was then slowly put on the coated surface of the polarizing film substrate with the rubbed surface of the polycarbonate substrate facing downward. The two substrates were positioned in such an arrangement that the rubbing direction of the polarizing film substrate and the rubbing direction of the polycarbonate substrate form an angle of 240° with the right-handed direction. Subsequently, the material was then irradiated with ultraviolet ray of 200 mJ/cm² from an ultraviolet lamp (UVGL-25 available from UVP) on the polycarbonate substrate side at room temperature to cause the polymerizable liquid crystal composition to be cured. The polycarbonate substrate was then peeled off the polymer thus obtained to obtain an optically anisotropic film having a 240° of right-handed helical structure supported on the polarizing film substrate.

The nonpolymerizable liquid crystal composition (M) obtained in Example 8 was then poured into an STN cell made of two sheets of glass substrates with a transparent electrode having a rubbed polyimide-oriented film with a cell gap of 6.2 μm and a twist angle of 240° with the left-handed direction. The STN cell was then clamped between a sheet of polarizing film and the polarizing film substrate on which the optically anisotropic film had been supported to prepare a liquid crystal display device. In this arrangement, the STN cell was brought into contact with the optically anisotropic film supported on the polarizing film, and the angle made by the axis of transmission of the polarizing film and the rubbing direction of the glass substrate of the STN cell was the same as in Example 9. When a voltage was applied across the transparent electrodes on the liquid crystal display device, a black-and-white display which is uniform over a wide temperature range was provided. The liquid crystal display device also exhibited excellent viewing angle properties.

EXAMPLE 14

An optically anisotropic film supported on a polarizing film was obtained in the same manner as in Example 13 except that a mixture of the polymerizable liquid crystal composition (E-1) and glass bead spacers having a diameter of 10.0 μm was applied to the entire surface of the polarizing film substrate by means of a coater. When a voltage was applied across the transparent electrodes on an STN cell prepared in the same manner as in Example 13, a uniform black-and-white display was obtained. The STN cell also exhibited excellent viewing angle properties.

REFERENCE EXAMPLE 1: Synthesis of Compound (I)

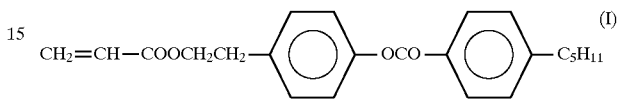

1st stage: synthesis of alcohol derivative (l-a)

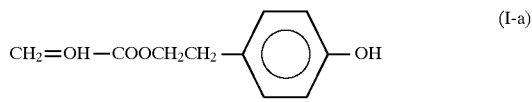

10.00 g of 2-(hydroxyphenyl)ethyl alcohol, 20.75 g of acrylic acid, and 3.00 g of p-toluenesulfonic acid were dissolved in 150 ml of benzene. The solution was then heated to reflux while water content thus produced was being separated therefrom by means of a Dean-Stark water separator for 10 hours. After the completion of reaction, the reaction product was allowed to cool to room temperature. The reaction solution was then washed with water. Benzene was then distilled off under reduced pressure to obtain 12.6 of a crude product. The crude product was then purified by silica gel column chromatography (1:1 mixture of ethyl acetate and n-hexane; Rf=0.53) to obtain 10.1 g of an alcohol derivative (l-a).

2nd stage: synthesis of Compound (l)

To 5.00 g of p-n-pentylbenzoate were added 10 ml of thionyl chloride and 0.01 g of dimethylformamide. The mixture was then stirred at room temperature for 10 minutes. Unreacted thionyl chloride was distilled off under reduced pressure. To the residue was then added 30 ml of methylene chloride. The-solution was then added dropwise to a solution of 5.00 g of the alcohol derivative (l-a) obtained in the 1st stage and 6.10 g of triethylamine in 70 ml of methylene chloride while the temperature thereof was being kept to not higher than 5° C. in 10 minutes. The mixture was then stirred at room temperature for 30 minutes. After the completion of reaction, the resulting reaction solution was extracted with 150 ml of methylene chloride. The resulting organic phase was then washed with water. The organic solvent was then distilled off under reduced pressure to obtain 9.10 g of a crude product. The crude product was then purified by column chromatography (1:5 mixture of ethyl acetate and n-hexane; Rf=0.44). The product was then recrystallized from 35 ml of ethanol to obtain 6.25 g of Compound (1). Compound (1) exhibited an isotropic liquid phase at room temperature (25° C.).

REFERENCE EXAMPLE 2: Synthesis of Compound (m)

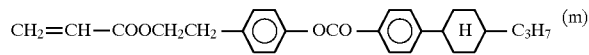

A solution of 6.90 g of p-(trans-4-n-propylcyclohexyl) benzoic chloride in 30 ml of methylene chloride was added dropwise to a solution of 5.00 g of the alcohol derivative (l-a) and 6.10 g of triethylamine in 70 ml of methylene chloride while the temperature thereof was being kept to not higher than 0° C. in 10 minutes. The mixture was then stirred at room temperature for 120 minutes. After the completion of reaction, the resulting reaction solution was extracted with 300 ml of methylene chloride. The resulting organic phase was then washed with water. The organic solvent was then distilled off under reduced pressure to obtain 11.10 g of a crude product. The crude product was then purified by column chromatography (1:10 mixture of ethyl acetate and n-hexane; Rf=0.21). The product was then recrystallized from 30 ml of ethanol to obtain 5.60 g of Compound (m). Compound (m) exhibited a crystal phase at room temperature (25° C.). Compound (m) was shifted to enantiotropically nematic phase at a temperature of 68° C. The transition temperature from nematic phase to isotropic liquid phase couldn't be accurately measured due to heat polymerization. However, it was found that the compound exhibits a nematic phase up to not lower than 100° C.

EXAMPLE 15: Preparation of polymerizable liquid crystal composition

A polymerizable liquid crystal composition (F) made of 25 parts by weight of the compound of formula (l), 25 parts by weight of the compound of formula (m), and 50 parts by weight of the compound of formula (a) was prepared. The polymerizable liquid crystal composition thus obtained exhibited an enantiotropically nematic phase at room temperature (25° C.). The phase transition temperature from nematic phase to isotropic liquid phase was 53° C. Refractive indices at 25° C. of extraordinary light ($n_e$) and ordinary light ($n_o$) are 1.61 and 1.50, respectively.

EXAMPLE 16

A polymerizable liquid crystal composition (F-1) made of 99 parts by weight of the polymerizable liquid crystal composition (F) obtained in Example 15 and 1 part by weight of a photopolymerization initiator "IRG-651" (available from Ciba Geigy) was prepared. Two sheets of glass substrates having a polyimide-alignment film formed thereon which had been rubbed were positioned opposed to each other with a gap of 100 μm in such an arrangement that the polyimide-alignment film faced inward. The polymerizable liquid crystal composition (F-1) was provided interposed between the two sheets of glass substrates. In this arrangement, the rubbing direction of the substrates made an angie of 180°. The polymerizable liquid crystal composition (F-1) clamped by the two sheets of substrates was placed between two sheets of polarizing plates which cross each other to confirm the alignment thereof. As a result, it was confirmed that the polymerizable liquid crystal composition had a uniform homogeneous alignment. The polymerizable liquid crystal composition (F-1) was then irradiated with ultraviolet ray of 160 mJ/cm² from a UV lamp (UVGL-25 available from UVP) to effect the photopolymerization thereof. As a result, an optically anisotropic film clamped by the two sheets of glass substrates was obtained. The optically anisotropic film thus obtained was kept at a temperature-of 150° C. for 10 minutes, and then allowed to cool to room temperature. The two sheets of glass substrates were then peeled off the optically anisotropic film to obtain an optically anisotropic film. The optically anisotropic film thus obtained was then placed between two sheets of polarizing plates which cross each other to observe the alignment thereof. As a result, it was confirmed that the uniform homogeneous alignment established before photopolymerization had been fixed by photopolymerization. Even when stored at a temperature of 120° C., the optically anisotropic film maintained the uniform homogeneous alignment, showing no problem of heat resistivity. The optically anisotropic film also was so flexible that it was not cracked when bent somewhat.

EXAMPLE 17

A polymerizable liquid crystal composition (F-2) made of 99 parts by weight of the polymerizable liquid crystal composition (F) obtained in Example 15, 1 part by weight of the photoinitiator "IRG-651" (available from Ciba Geigy), and 0.18 parts by weight of a compound represented by formula (III-a):

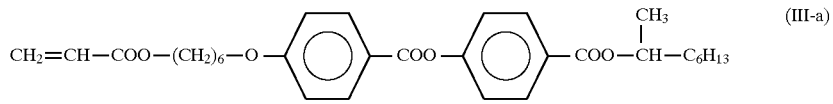

wherein the absolute configuration of asymmetric carbon atom is the S configuration was prepared. The polymerizable liquid crystal composition (F-2) was measured for pitch. As a result, the pitch was 60 μm with left-handed, proving that a chiral nematic liquid crystal had been obtained.

EXAMPLE 18

Two sheets of glass substrates having a polyimide-alignment film formed thereon which had been rubbed were positioned opposed to each other with a gap of 10 μm in such an arrangement that the polyimide-alignment film faced inward. The polymerizable liquid crystal composition (F-2) obtained in Example 17 was provided interposed between the two sheets of glass substrates. In this arrangement, the rubbing direction of the substrates made an angle of 90° counterclockwise. The polymerizable liquid crystal composition (F-2) clamped by the two sheets of glass substrates was placed between two sheets of polarizing plates which cross each other to observe the alignment thereof. As a result, it was confirmed that the polymerizable liquid crystal composition had a uniform twisted nematic alignment. The polymerizable liquid crystal composition (F-2) was then irradiated with ultraviolet ray of 160 mJ/cm² from a UV lamp (UVGL-25 available from UVP) to effect the photopolymerization thereof. As a result, an optically anisotropic film clamped by the two sheets of glass substrates was obtained. The optically anisotropic film thus obtained was kept at a temperature of 150° C. for 10 minutes, and then allowed to cool to room temperature. The two sheets of glass substrates were then peeled off the optically anisotropic film to obtain an independent optically anisotropic film. The optically anisotropic film thus obtained was then placed between two sheets of polarizing plates which cross each other to observe the orientation thereof. As a result, it was confirmed that the uniform twisted nematic alignment established before photopolymerization had been fixed by photopolymerization. Even when stored at a temperature of 150° C. for 34 hours, the optically anisotropic film maintained the uniform twisted nematic alignment, showing an excellent heat resistivity.

EXAMPLE 19

A polymerizable liquid crystal composition (E-3) made of 99 parts by weight of the polymerizable liquid crystal composition (E) obtained in Example 7, 1 part by weight of the photopolymerization initiator "IRG-651" (available from Ciba Geigy), and 1.25 parts by weight of a compound represented by formula (III-b):

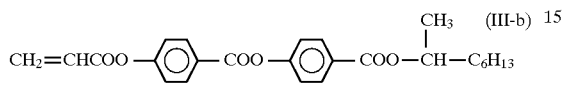

wherein the absolute configuration of asymmetric carbon atom is the S configuration was prepared. The polymerizable liquid crystal composition (E-3) was measured for pitch. As a result, the pitch was 8.2 μm with left-handed direction, proving that a-chiral nematic liquid crystalline composition had been obtained.

EXAMPLE 20

Two sheets of glass substrates having a polyimide-alignment film formed thereon which had been rubbed were positioned opposed to each other with a gap of 6 μm in such an arrangement that the polyimide-alignment film faced inward. The polymerizable liquid crystal composition (E-3) obtained in Example 19 was provided interposed between the two sheets of glass substrates. In this arrangement, the rubbing direction of the substrates made an angle of 270° with left-handed direction. The polymerizable liquid crystal composition (E-3) clamped by the two sheets of glass substrates was placed between two sheets of polarizing plates which cross each other to observe the orientation thereof. As a result, it was confirmed that the polymerizable liquid crystal composition had a uniform supertwisted nematic alignment. The polymerizable liquid crystal composition (E-3) was then irradiated with ultraviolet ray of 160 mJ/cm² from a UV lamp (UVGL-25 available from UVP) to effect the photopolymerization thereof. As a result, an optically anisotropic film clamped by the two sheets of glass substrates was obtained. The optically anisotropic film thus obtained was kept at a temperature of 150° C. for 10 minutes, and then allowed to cool to room temperature. The two sheets of glass substrates were then peeled off the optically anisotropic film to obtain an independent optically anisotropic film. The optically anisotropic film thus obtained was then placed between two sheets of polarizing plates which cross each other to observe the alignment thereof. As a result, it was confirmed that the uniform supertwisted nematic alignment established before photopolymerization had been maintained, showing an excellent heat resistivity.

EXAMPLE 21

A polymerizable liquid crystal composition (E-4) with a helical pitch of 1.6 μm made of 95.6 parts by weight of the polymerizable liquid crystal composition (E) obtained in Example 7, 1 part by weight of the photoinitiator "IRG-651" (Ciba Geigy), and 4.4 parts by weight of an optically active compound "R-811" (available from Merck & Co.) which induces a right-handed helical structure was obtained. A polyimide orientating agent "AL-1254" (available from Japan Synthetic Rubber Co., Ltd.) was applied to a glass substrate, dried at a temperature of 120° C. for 1 hour, and then rubbed with rayon cloth. Two sheets of the glass substrates having a rubbed polyimide-alignment film were positioned opposed to each other with a gap of 10 μm in such an arrangement that the rubbing direction thereof made an angle of 90° clockwise. The polymerizable liquid crystal composition (E-4) was then provided interposed between the two sheets of glass substrates. The polymerizable liquid crystal composition clamped by the two sheets of glass substrates was then irradiated with ultraviolet ray of 350 mJ/cm² from an ultraviolet lamp (metal halide lamp with 80 W) at room temperature so that the polymerizable liquid crystal composition was subjected to photopolymerization for curing. One of the two sheets of glass substrates was then peeled off the polymer thus obtained to obtain an optically anisotropic film. The optically anisotropic film thus obtained was then observed under a polarization microscope. As a result, it was confirmed that the optically anisotropic film had been uniform and had no defects. Further, the optically anisotropic film was observed by a conoscope. As a result, a definite isogyre was seen in the center of the field of view. From the retardation change caused by the insertion of a sharp color plate, it was confirmed that the optically anisotropic film had been a uniaxial negative crystal whose optical axis runs thickwise. Even when stored at a temperature of 120° C., the optically anisotropic film maintained a cholesteric alignment, showing no problem of heat resistivity.

EXAMPLE 22

A polymerizable liquid crystal composition (E-2) made of 100 parts by weight of the polymerizable liquid crystal composition (E) obtained in Example 21 and 1 part by weight of the photoinitiator "IRG-651" (available from Ciba Geigy) was obtained. A 0.1 wt. % ethanol solution of egg yolk lecithin was applied to a glass substrate to form a vertically-oriented film. Two sheets of the glass substrates on which a vertically-alignment film had been formed were then positioned opposed to each other with a gap of 20 μm. The polymerizable liquid crystal composition (E-2) was then provided interposed between the two sheets of glass substrates. The polymerizable liquid crystal composition clamped by the two sheets of glass substrates was then observed under a polarization microscope. As a result, no defects were observed. The polymerizable liquid crystal composition was also observed by a conoscope. As a result, a definite isogyre was seen in the center of the field of view, proving that the polymerizable liquid crystal composition had a homeotropic alignment. The polymerizable liquid crystal composition clamped by the two sheets of glass substrates was then irradiated with ultraviolet ray of 160 mJ/cm² from an ultraviolet lamp (UVGL-25 available from UVP) at room temperature so that the polymerizable liquid crystal composition was subjected to photopolymerization for curing. One of the two sheets of glass substrates was then peeled off the polymer thus obtained to obtain an optically anisotropic film. The optically anisotropic film thus obtained was then observed by a conoscope. As a result, it was found that the optically anisotropic film had maintained the homeotropic orientation established before polymerization. Further, the optically anisotropic film was placed interposed between two sheets of polarizing plates which cross each other for observation. As a result, the optically anisotropic film showed a uniformly dark view, proving that a uniform homeotropic alignment was obtained. The optically anisotropic film was measured for dependence of retardation on angle of incidence by means of a He-Ne laser. The results are set forth in FIG. 1.

The angle of incidence as defined herein indicates the angle of incident light from the normal line of the substrate. FIG. 1 shows that a homeotropic alignment is fixed in the optically anisotropic film. Even when stored at a temperature of 120° C., the optically anisotropic film maintained the homeotropic alignment, showing no problem of heat resistivity.

EXAMPLE 23

A polyimide alignment agent "Al-1254" (available from Japan Synthetic Rubber Co., Ltd.) was applied on a glass substrate, dried at a temperature of 120° C. for 1 hour to form a polyimide-alignment film, and then rubbed with rayon cloth. Two sheets of the glass substrates having a rubbed polyimide-alignment film were then positioned opposed to each other with a gap of 4 μm in such an arrangement that the rubbing direction thereof made an angle of 180°. The polymerizable liquid crystal composition (E-2) was then provided interposed between the two sheets of glass substrates in the same manner as in Example 22. The polymerizable -liquid crystal composition clamped by the two sheets of glass substrates was then observed under a polarizing microscope. As a result, no defects were observed, proving that the polymerizable liquid crystal composition had a uniform homogeneous alignment. The polymerizable liquid crystal composition clamped by the two sheets of glass substrates was then irradiated with ultraviolet ray of 160 mJ/cm$^2$ from an ultraviolet lamp (UVGL-25 available from UVP) at room temperature so that the polymerizable liquid crystal composition was subjected to photopolymerization for curing. One of the two sheets of glass substrates was then peeled off the polymer thus obtained to obtain an optically anisotropic film. The optically anisotropic film thus obtained was then observed under a polarizing microscope. As a result, it was found that the optically anisotropic film had no defects and a uniform homogeneous orientation established before photopolymerization had been completely fixed therein. The optically anisotropic film was measured for dependence of retardation on angle of incidence by means of a He-Ne laser. The results are set forth in FIG. 2.

Figure 2:
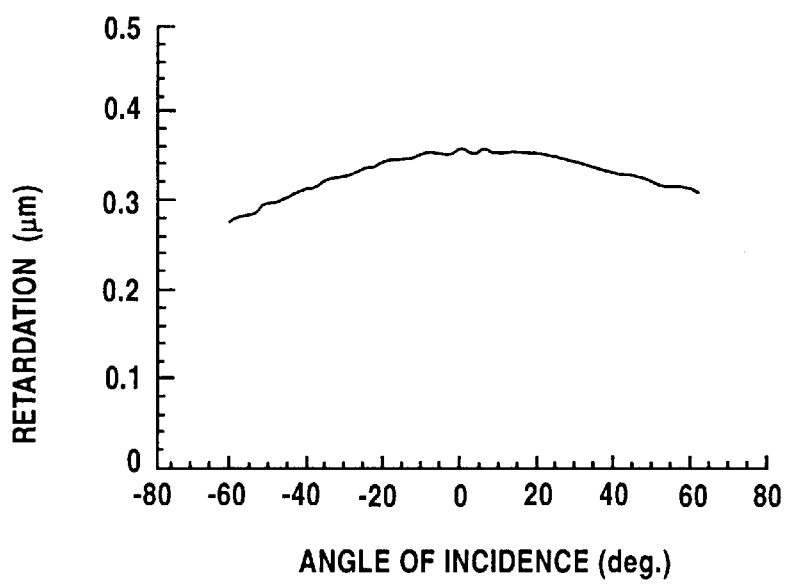
FIG. 2 is a graph illustrating the incident angular dependence of retardation of another optically anisotropic film according to the present invention.

The angle of incidence as defined herein indicates the angle of incident light from the normal line of the substrate within a plane formed by the rubbing direction and the normal line of the substrate. FIG. 2 shows that a homogeneous orientation is fixed in the optically anisotropic film. Even when stored at a temperature of 120° C., the optically anisotropic film maintained the homogeneous alignment, showing no problem of heat resistivity.

EXAMPLE 24

A 0.1 wt. % ethanol solution of egg yolk lecithin was applied on a glass substrate to form a vertically-alignment film. A polyimide alignment agent "Al-1254" (available from Japan Synthetic Rubber Co., Ltd.) was applied on a glass substrate, dried at a temperature of 120° C. for 1 hour to form a polyimide-alignment film, and then rubbed with rayon cloth. The glass substrate having a vertically-alignment film formed thereon and the rubbed glass substrate were then positioned opposed to each other with a gap of 9 μm. The polymerizable liquid crystal composition (E-2) was then provided interposed between the two sheets of glass substrates in the same manner as in Example 22. The polymerizable liquid crystal composition clamped by the two sheets of glass substrates was placed interposed between two sheets of polarizing plates which cross each other for observation. As a result, no defects were observed, proving that the polymerizable liquid crystal composition had a uniform hybrid orientation. The polymerizable liquid crystal composition clamped by the two sheets of glass substrates was then irradiated with ultraviolet ray of 160 mJ/cm$^2$ from an ultraviolet lamp (UVGL-25 available from UVP) at room temperature so that the polymerizable liquid crystal composition was subjected to photopolymerization for curing. The glass substrate having a vertically-oriented film formed thereon was then peeled off the polymer thus obtained to obtain an optically anisotropic film. The optically anisotropic film thus obtained was then placed interposed between two sheets of polarizing plates which cross each other for observation. As a result, it was found that a uniform hybrid orientation established before photopolymerization had been completely fixed in the optically anisotropic film. The optically anisotropic film was measured for dependence of retardation on angle of incidence by means of a He-Ne laser. The results are set forth in FIG. 3.

Figure 3:
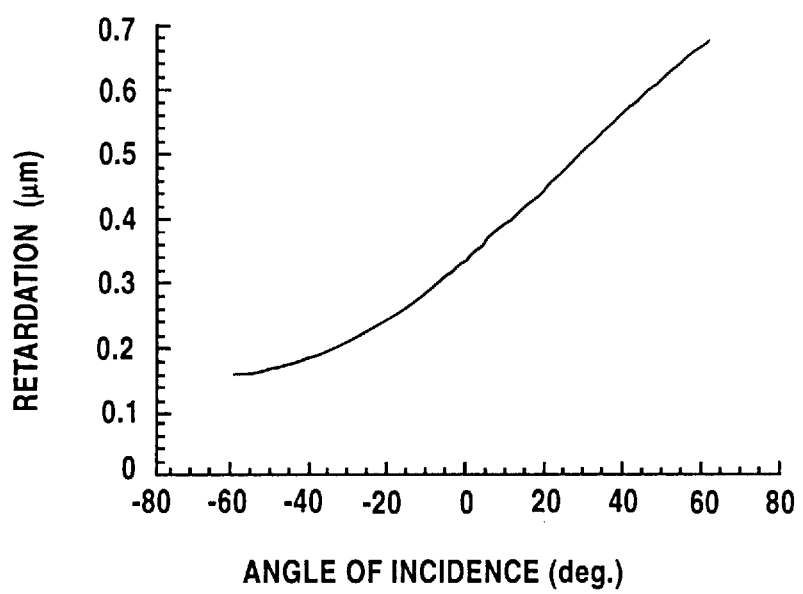
FIG. 3 is a graph illustrating the incident angular dependence of retardation of a further optically anisotropic film according to the present invention.

The angle of incidence as defined herein indicates the angle of incident light from the normal line of the substrate within a plane formed by the rubbing direction and the normal line of the substrate. FIG. 3 shows that a hybrid alignment is fixed in the optically anisotropic film. Even when stored at a temperature of 120° C., the optically anisotropic film maintained the hybrid alignment, showing no problem of heat resistivity.

EXAMPLE 25

A polycarbonate substrate and a polytetrafluoroethylene substrate which had both been rubbed with rayon cloth were positioned opposed to each other with a gap of 8 μm in such an arrangement that the rubbing direction thereof made an angle of 180°. The polymerizable liquid crystal composition (E-2) was then provided interposed between the two sheets of substrates in the same manner as in Example 22. The polymerizable liquid crystal composition clamped by the polycarbonate substrate and the polytetrafluoroethylene substrate was irradiated with ultraviolet ray of 350 mJ/cm$^2$ from an ultraviolet lamp (metal halide lamp with 80 W) at room temperature on the polycarbonate substrate side so that it was subjected to photopolymerization for curing. The polytetrafluoroethylene substrate was then peeled off the polymer thus obtained to obtain an optically anisotropic film. The optically anisotropic film thus obtained was then observed for the conditions of the polymer under a polarizing microscope. As a result, it was found that the optically anisotropic film had no defects and had a uniform homogeneous alignment fixed therein. Even when stored at a temperature of 120° C., the optically anisotropic film maintained the homogeneous alignment, showing no problem of heat resistivity.

EXAMPLE 26

A polarizing film "LLC2-81-12S" (available from Panac) was coated with a polyvinyl alcohol, and then rubbed in the direction from which the axis of transmission thereof makes an angle of 45°. The polarizing film substrate and a rubbed polycarbonate substrate were positioned opposed to each other with a gap of 8 μm in such an arrangement that the rubbing direction thereof made an angle of 180°. The polymerizable liquid crystal composition (E-2) was then provided interposed between the two sheets of substrates in the same manner as in Example 22. The polymerizable liquid crystal composition clamped by the polarizing film and the polycarbonate substrate was irradiated with ultraviolet ray of 350 mJ/cm² from an ultraviolet lamp (metal halide lamp with 80 W) at room temperature on the polycarbonate substrate side so that it was subjected to photopolymerization for curing. The polytetrafluoroethylene substrate was then peeled off the polymer thus obtained to obtain an optically anisotropic film. The optically anisotropic film thus obtained was an ellipsoidal polarizing plate having an excellent uniformity. Even when stored at a temperature of 80° C., the ellipsoidal polarizing plate maintained its properties, showing no problem of heat resistivity.

EXAMPLE 27

A polymerizable liquid crystal composition (G) made of 47.5 parts by weight of the compound of formula (a), 47.5 parts by weight of the compound of formula (d), and 5 parts by weight of a compound represented by formula (g):

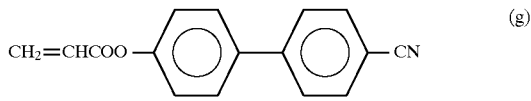

was prepared. The composition thus obtained exhibited an enantiotropically nematic phase at -room temperature (25° C.). The transition temperature from nematic phase to isotropic liquid phase was 52° C. Refractive indices at 25° C. of extraordinary light ($n_e$) and ordinary light ($n_o$) are 1.67 and 1.51, respectively and a dielectric constant anisotropy is +0.7. A polymerizable liquid crystal composition (G-1) made of 99 parts by weight of the polymerizable liquid crystal composition (G) and 1 part by weight of the photoinitiator "IRG-651" (Ciba Geigy) was obtained. Two sheets of glass substrates with an ITO transparent electrode were then positioned opposed to each other with a gap of 10 μm in such an arrangement that the ITO surfaces thereof faced inward. The polymerizable liquid crystal composition (G-1) was then provided interposed between the two sheets of glass substrates. The polymerizable liquid crystal composition clamped by the two sheets of glass substrates with an ITO transparent electrode was then observed under a polarizing microscope. As a result, it was confirmed that the polymerizable liquid crystal composition had a nonuniform orientation, i.e., random orientation. A 1 KHz sinusoidal wave having 50 Vrms was applied across the two ITO electrodes by which the randomly-aligned polymerizable liquid crystal composition had been clamped. It was confirmed by a conoscope that the polymerizable liquid crystal composition had been vertically oriented under these conditions. While being vertically oriented under the application of a voltage, the polymerizable liquid crystal composition was irradiated with ultraviolet ray of 160 mJ/cm² from an ultraviolet lamp (UVGL-25 available from UVP) at room temperature so that the polymerizable liquid crystal composition was subjected to photopolymerization for curing. The optically anisotropic film thus obtained between the two sheets of glass substrates with an ITO electrode was then observed by a conoscope. As a result, it was confirmed that the vertical orientation established before polymerization had been fixed in the polymerizable liquid crystal composition. Further, the optically anisotropic film was placed interposed between two sheets of polarizing plates which cross each other for observation. As a result, the optically anisotropic film showed a uniformly dark view, proving that a uniform vertical alignment was obtained. Thus, it was made obvious that an optically anisotropic film having a thickwise refractive index greater than inplane refractive index and an excellent uniformity was obtained. Even when stored at a temperature of 120° C., the optically anisotropic film maintained the uniform vertical orientation, showing no problem of heat resistivity.

EXAMPLE 28

A sheet of glass substrate with an ITO transparent electrode on which a 0.1 wt. % ethanol solution of egg yolk lecithin as a release agent had been applied and dried and another sheet of glass substrate with an ITO transparent electrode were-positioned opposed to each other with a gap of 10 μm in such an arrangement that the ITO surfaces thereof faced inward. The polymerizable liquid crystal composition (G-1) prepared in Example 27 was then provided interposed between the two sheets of glass substrates. The polymerizable liquid crystal composition clamped by the two sheets of glass substrates with an ITO transparent electrode was then observed under a polarizing microscope. As a result, it was confirmed that the polymerizable liquid crystal composition had a nonuniform alignment, i.e., random alignment. A 1 KHz sinusoidal wave having 50 Vrms was applied across the two ITO electrodes by which the randomly-aligned polymerizable liquid crystal composition had been clamped. It was confirmed by a conoscope that the polymerizable liquid crystal composition had been vertically aligned under these conditions. While being vertically aligned under the application of a voltage, the polymerizable liquid crystal composition was irradiated with ultraviolet ray of 160 mJ/cm² from an ultraviolet lamp (UVGL-25 available from UVP) at room temperature so that the polymerizable liquid crystal composition was subjected to photopolymerization for curing. The glass substrate coated with egg yolk lecithin was then peeled off the polymerizable liquid crystal composition to obtain an optically anisotropic film supported on the other glass substrate with an ITO transparent electrode. The optically anisotropic film thus obtained was then observed by a conoscope. As a result, it was confirmed that the vertical orientation established before polymerization had been fixed in the polymerizable liquid crystal composition. Further, the optically anisotropic film was placed interposed between two sheets of polarizing plates which cross each other for observation. As a result, the optically anisotropic film showed a uniformly dark view, proving that a uniform vertical alignment was obtained. Thus, it was made obvious that an optically anisotropic film having a thickwise refractive index greater than inplace refractive index and an excellent uniformity was obtained. Even when stored at a temperature of 120° C., the optically anisotropic film maintained the uniform vertical orientation, showing no problem of heat resistivity.

EXAMPLE 29

The polymerizable liquid crystal composition was subjected to photopolymerization for curing in the same manner as in Example 28 except that an aluminum plate having a thickness of 1 mm was used instead of the glass substrate with an ITO transparent electrode. The aluminum plate was then peeled off the polymerizable liquid crystal composition to obtain an optically anisotropic film supported on the glass substrate with an ITO substrate. The optically anisotropic film thus obtained was then observed by a conoscope. As a result, it was confirmed that the vertical orientation established before polymerization had been fixed as it is. The optically anisotropic film was placed between two sheets of polarizing plates which cross each other for observation. As a result, the optically anisotropic film showed a uniformly dark view, proving that a uniform vertical alignment was obtained. Thus, it was made obvious that an optically anisotropic film having a thickwise refractive index greater than inplace refractive index and an excellent uniformity was obtained. Even when stored at a temperature of 120° C., the optically anisotropic film maintained the uniform vertical alignment, showing no problem of heat resistivity.

EXAMPLE 30

A sheet of glass substrate with an ITO transparent electrode on which a 0.1 wt. % ethanol solution of egg yolk lecithin as a release agent had been applied and dried and another sheet of glass substrate with an ITO transparent electrode were positioned opposed to each other with a gap of 20 µm in such an arrangement that the ITO surfaces thereof faced inward. The polymerizable liquid crystal composition (G-1) prepared in Example 27 was then provided interposed between the two sheets of glass substrates. The polymerizable liquid crystal composition clamped by the two sheets of glass substrates with an ITO transparent electrode was then observed under a polarizing microscope. As a result, it was confirmed that the polymerizable liquid crystal composition had a nonuniform orientation, i.e., random orientation. A 1 KHz sinusoidal wave having 100 Vrms was applied across the two ITO electrodes by which the randomly-oriented polymerizable liquid crystal composition had been clamped. It was confirmed by a conoscope that the polymerizable liquid crystal composition had been vertically aligned under these conditions. While being vertically aligned under the application of a voltage, the polymerizable liquid crystal composition was irradiated with ultraviolet ray of 160 mJ/cm$^2$ from an ultraviolet lamp (UVGL-25 available from UVP) at room temperature so that the polymerizable liquid crystal composition was subjected to photopolymerization for curing. The glass substrate coated with egg yolk lecithin was then peeled off the polymerizable liquid crystal composition to obtain an optically anisotropic film supported on the other glass substrate with an ITO transparent electrode. The optically anisotropic film was then dipped in distilled water for 30 minutes. The other glass substrate with an ITO transparent electrode was then peeled off the optically anisotropic film to obtain an independent film-like optically anisotropic film. The optically anisotropic film thus obtained was then observed by a conoscope. As a result, it was confirmed that the vertical alignment established before polymerization had been completely fixed in the polymerizable liquid crystal composition. Further, the optically anisotropic film was placed interposed between two sheets of polarizing plates which cross each other for observation. As a result, the optically anisotropic film showed a uniformly dark view, proving that a uniform vertical orientation was obtained. Thus, it was made obvious that an optically anisotropic film having a thickwise refractive index greater than inplace refractive index and an excellent uniformity was obtained. Even when stored at a temperature of 120° C., the optically anisotropic film maintained the uniform vertical alignment, showing no problem of heat resistivity.

EXAMPLE 31

Figure 4:
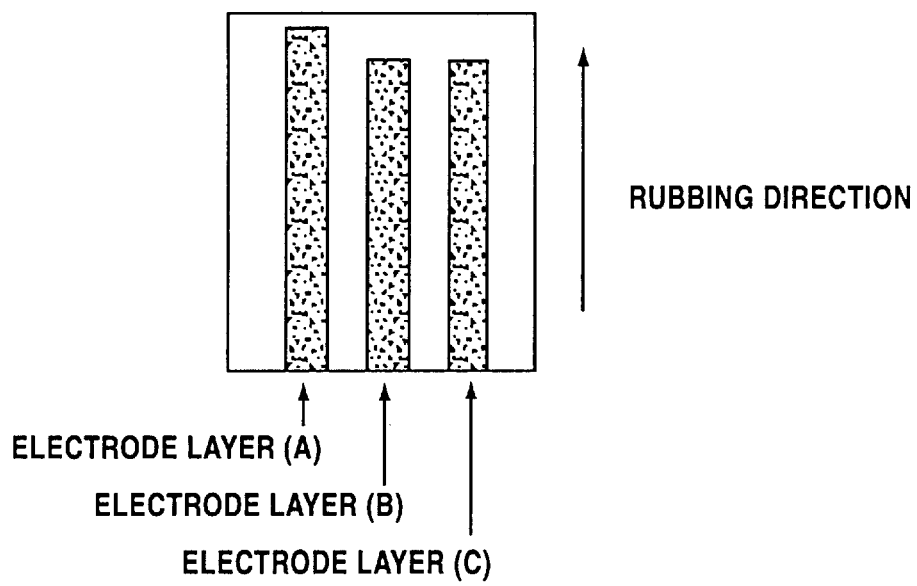
FIG. 4 is a diagram illustrating a glass substrate (i) used in Example 31.

3.0 g of a polyvinyl alcohol (polymerization degree: about 500) and 3.0 g of 1,8-octanediol were dissolved in a mixture of 100 g of water and 100 g of ethanol to prepare a solution of a composition for orienting liquid crystal. The solution thus obtained was then spin-coated onto a 25 mm×30 mm glass substrate (i) having electrode layers (A), (B) and (C) as ITO transparent electrode layers as shown in FIG. 4. The solvents were almost dried during spin coating. As a result, 1,8-octanediol was deposited on the glass substrate. Thus, a uniform film was not obtained. The glass substrate was heated to a temperature of 110° C. for 5 minutes, and then allowed to cool to room temperature to obtain a uniform film having no deposit of 1,8-octanediol. The glass substrate was then rubbed in the direction shown in FIG. 4 to obtain an oriented glass substrate (i-R).

Figure 5:
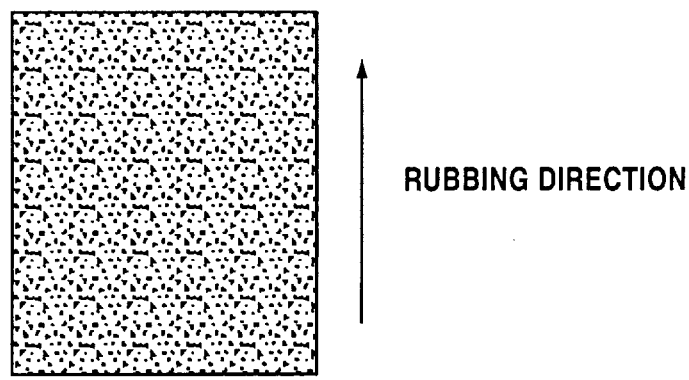
FIG. 5 is a diagram illustrating a glass substrate (ii) used in Example 31.
Figure 6:
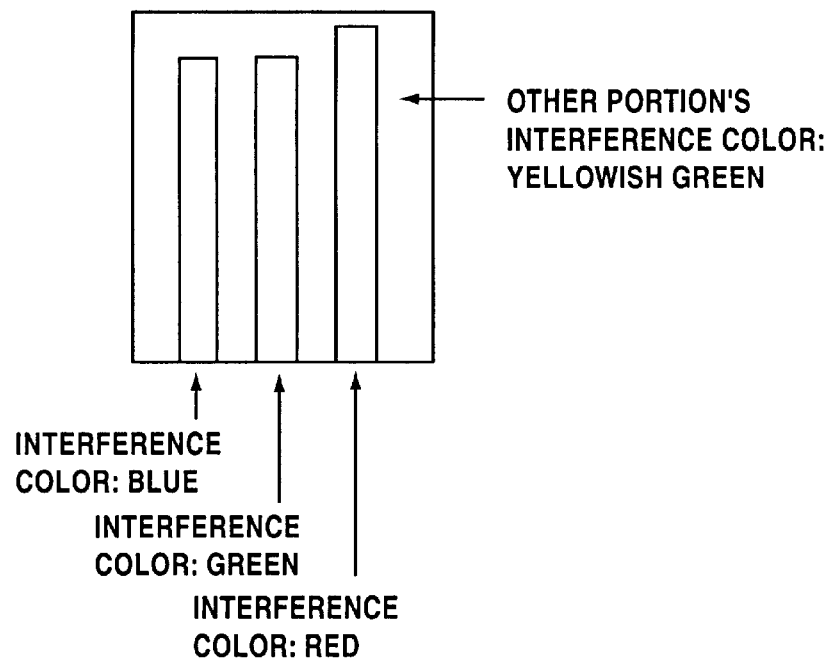
FIG. 6 is a diagram illustrating the results of observation of a color filter for liquid crystal display device of the present invention of Example 31.

A polyimide alignment agent "AL-1254" (available from Japan Synthetic Rubber Co., Ltd.) was spin-coated onto a glass substrate (ii) with the same size as that of the glass substrate (i) having an ITO transparent electrode layer over the entire surface thereof as shown in FIG. 5. The substrate was then kept at a temperature of 180° C. for 80 minutes to form a polyimide film thereon. The polyimide film thus formed was then rubbed in the direction shown in FIG. 5 to prepare an oriented glass substrate (ii-R). The glass substrate (i-R) and the glass substrate (ii-R) were positioned opposed to each other in such an arrangement that the rubbed surfaces thereof faced each other. The polymerizable liquid crystal composition (G-1) obtained in Example 27 was then provided interposed between the two sheets of glass substrates. In this arrangement, the gap between the two sheets of glass substrates and the angle made by the rubbing direction thereof were determined to 9 µm and 180°, respectively. The polymerizable liquid crystal composition clamped by two sheets of glass substrates was placed between two sheets of polarizing plates which cross each other for observation. As a result, it was confirmed that a uniform uniaxial orientation (homogeneous orientation) had been obtained. A 1 KHz sinusoidal wave with 4.1 Vrms was applied across the electrode layer (A) of the glass substrate (i) and the opposing electrode. A 1 KHz sinusoidal wave with 2.9 Vrms was applied across the electrode layer (B) of the glass substrate (i) and the opposing electrode. A 1 KHz sinusoidal wave with 3.3 Vrms was applied across the electrode layer (C) of the glass substrate (i) and the opposing electrode. Under these conditions, the polymerizable liquid crystal composition was irradiated with ultraviolet ray of 160 mJ/cm$^2$ from an ultraviolet lamp (UVGL-25 available from UVP) so that the polymerizable liquid crystal composition was subjected to photopolymerization to obtain an optically anisotropic film clamped by the two sheets of glass substrates. The optically anisotropic film thus obtained was kept at a temperature of 150° C. for 5 minutes, and then allowed to cool to room temperature. The glass substrate (i-R) was then peeled off the optically anisotropic film. For the observation of interference color, the optically anisotropic film was placed between two sheets of polarizing plates which cross each other in such an arrangement that the optical axis (rubbing direction) of the optically anisotropic film and the axis of polarization of the polarizing plate made an angle of 45°. The results as set forth in FIG. 6 were obtained. Different interference colors were uniformly developed at different electrode layers on the one sheet of optically anisotropic film. In some detail, the portions of the optically anisotropic film in contact with the electrode layers (A), (B) and (C) exhibited interference colors of red, green and blue, respectively. The remaining portion exhibited an interference color of yellowish green. It was thus made obvious that an optically anisotropic film having different optical phase retardation with different pixels had been obtained. Even when stored at a temperature of 150° C., the optically anisotropic film maintained the uniform interference colors, showing no problem of heat resistivity.

EXAMPLE 32

Figure 7:
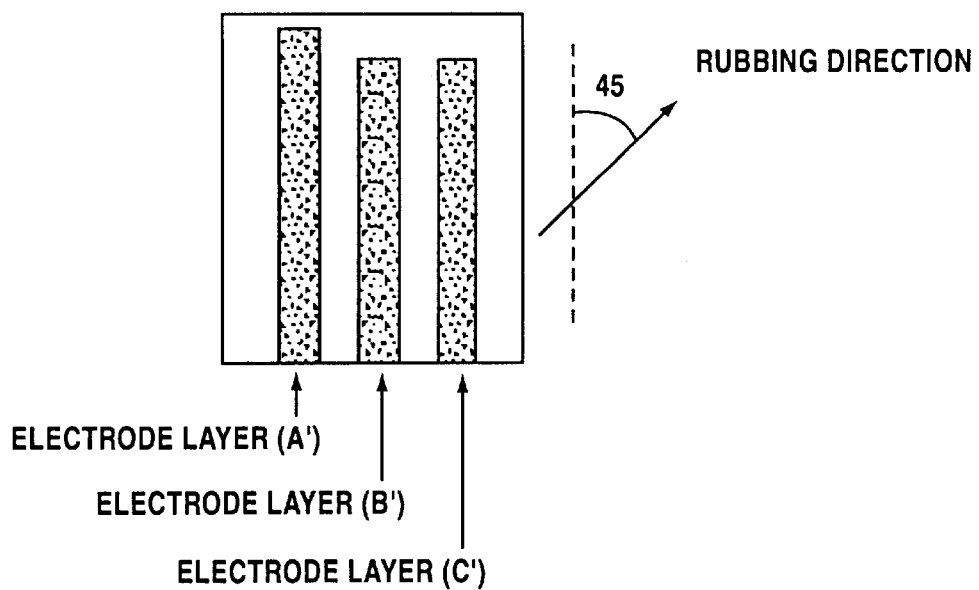
FIG. 7 is a diagram illustrating a glass substrate (iii) used in Example 32.
Figure 8:
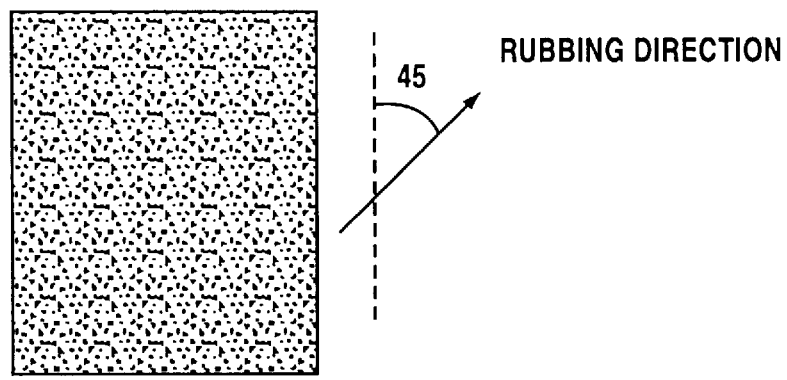
FIG. 8 is a diagram illustrating a glass substrate (iv) used in Example 32.

A polyimide orienting agent "AL-1254" was spin-coated onto a 25 mm×30 mm glass substrate (iii) having electrode layers (A'), (B') and (C') as ITO transparent electrode layers as shown in FIG. 7. The substrate was then stored at a temperature of 180° C. for 80 minutes to form a polyimide film thereon. The polyimide film was then rubbed in the direction shown in FIG. 4 to prepare an oriented glass substrate (iii-R). The polyimide alignment agent "AL-1254" was spin-coated onto a glass substrate (iv) of the same size as the glass substrate (iii) having an ITO transparent electrode layer on the entire surface thereof as shown in FIG. 8. The substrate was then stored at a temperature of 180° C. for 80 minutes to form a polyimide film thereon. The polyimide film was then rubbed in the direction shown in FIG. 8 to prepare a glass substrate which is treated to align the liquid crystals (iv-R). The glass substrate (iii-R) and the glass substrate (iv-R) were positioned opposed to each other in such an arrangement that the rubbed surfaces thereof faced each other. A nematic liquid crystal composition "PN-019" (available from Rodic Co., Ltd.) having a refractive index anisotropy of 0.189 and a dielectric constant anisotropy of 7.2 was provided interposed between the two sheets of glass substrates. In this arrangement, the gap between the two sheets of glass substrates and the angle made by the rubbing direction of the glass substrates were determined to 5.3 $\mu$m and 90°, respectively. Thus, a twisted nematic liquid crystal cell was prepared. The optically anisotropic film prepared in Example 31 was then superimposed on the twisted nematic liquid crystal cell. The laminate was then placed between two sheets of polarizing films whose axis of polarization run in parallel to each other. In this arrangement, the axis of polarization of the two sheets of polarizing films made an angle of 45° with respect to the optical axis (rubbing direction) of the optically anisotropic film. Further, the respective rubbing direction of the two sheets of substrates constituting the twisted nematic liquid crystal cell is parallel or perpendicular to the axis of polarization of the polarizing film. In the laminate, the portion on the optically anisotropic film which exhibits an interference color of red faced the electrode layer (A') of the liquid crystal cell, the portion on the optically anisotropic film which exhibits an interference color of green faced the electrode layer (B') of the liquid crystal cell, and the portion on the optically anisotropic film which exhibits an interference color of blue faced the electrode layer (C') of the liquid crystal cell. The liquid crystal display device-thus prepared exhibited sharp colors of red, green and blue at the electrode layers (A'), (B') and (C'), respectively, when no voltage was applied across the electrodes. When a voltage was applied across the electrodes, the liquid crystal display device exhibited sharp colors of green, red and yellow at the electrode layers. (A'), (B') and (C'), respectively.

EXAMPLE 33

Figure 9:
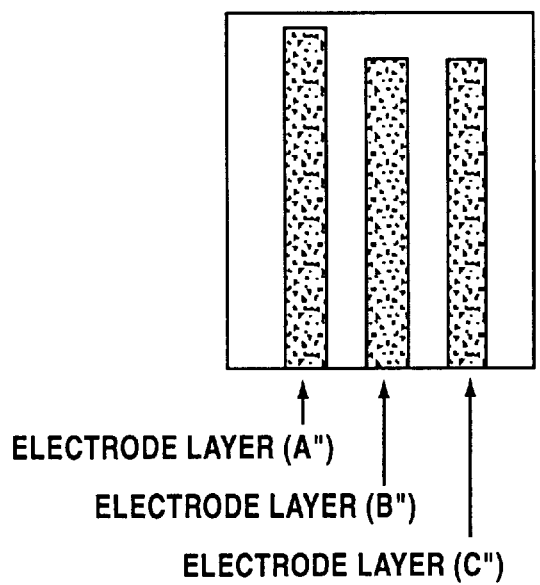
FIG. 9 is a diagram illustrating a glass substrate (v) used in Example 33.
Figure 10:
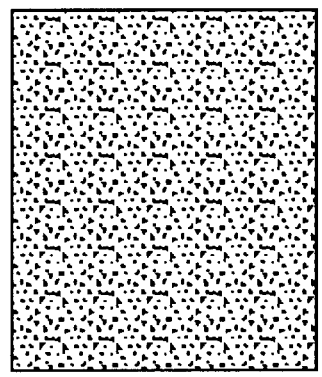
FIG. 10 is a diagram illustrating a glass substrate (vi) used in Example 33.

A polymerizable liquid crystal composition (H) made of 80 parts by weight of the same nematic liquid crystal composition "PN-019" as used in Example 32, 13.6 parts by weight of a caprolacton-modified neopentylglycol diacrylate hydroxypivalate "HX-220" (available from Nippon Kayaku Co., Ltd.), 6 parts by weight of lauryl acrylate "L-A" (available from Kyoei Yushi Kagaku Kogyo K. K.), and 0.4 parts by weight of a photopolymerization initiator "IRG-651" (available from Ciba Geigy) was prepared. A 25 mm×30 mm glass substrate (V) having electrode layers (A"), (B") and (C") as ITO transparent electrodes as shown in FIG. 9 and a glass substrate of the same size as the glass substrate (v) having an ITO transparent electrode on the entire surface thereof as shown in FIG. 10 were prepared. The glass substrate (v) and the glass substrate (vi) were positioned opposed to each other. The polymerizable liquid crystal composition (H) was then provided interposed between the two sheets of glass substrates. In this arrangement, the gap between the two sheets of glass substrates was determined to 12 $\mu$m. The polymerizable liquid crystal composition clamped by the two sheets of glass substrates was then irradiated with ultraviolet ray of 500 mJ/cm$^2$ from a metal halide lamp with 80 W so that it was subjected to polymerization to prepare a liquid crystal cell having a light adjusting layer made of transparent solid substance and liquid crystal material between the two sheets of substrates. The optically anisotropic film prepared in Example 31 was then superimposed on the liquid crystal cell. The laminate was then placed between two sheets of polarizing films whose axis of polarization cross each other. In this arrangement, the optical axis (rubbing direction) of the optically anisotropic film made an angle of 45° with respect to the axis of polarization of the polarizing films. In the laminate, the portion on the optically anisotropic film which exhibits an interference color of red faced the electrode layer (A") of the liquid crystal cell, the portion on the optically anisotropic film which exhibits an interference color of green faced the electrode layer (B") of the liquid crystal cell, and the portion on the optically anisotropic film which exhibits an interference color of blue faced the electrode layer (C") of the liquid crystal cell. The liquid crystal display device thus prepared exhibited cloudy (white) at the electrode layers (A"), (B") and (C") when no voltage was applied across the electrodes. When a voltage was applied across the electrodes, the liquid crystal display device exhibited sharp colors of red, green and blue at the electrode layers (A"), (B") and (C"), respectively.

EXAMPLE 34

A polymerizable liquid crystal composition (E-5) made of 99 parts by weight of-the polymerizable liquid crystal composition (E) obtained in Example 7 and 1 part by weight of a photopolymerization initiator was obtained. 3.0 g of a polyvinyl alcohol (polymerization degree: about 500) and 3.0 g of 1,8-octanediol were dissolved in a mixture of 100 g of water and 100 g of ethanol to prepare a solution of a composition for aligning liquid crystal. The solution thus obtained was then spin-coated onto a glass substrate. The solvents were almost dried during spin coating. As a result, 1,8-octanediol was deposited on the glass substrate. Thus, a uniform film was not obtained. The glass substrate was heated to a temperature of 110° C. for 10 minutes, and then allowed to cool to room temperature to obtain a uniform film having no deposit of 1,8-octanediol. The glass substrate was then rubbed to obtain an oriented glass substrate. Thus, a glass substrate (i) having an alignment film formed thereon was prepared. A polyimide alignment agent "AL-1254" (available from Japan Synthetic Rubber Co., Ltd.) was spin-coated onto a glass substrate. The substrate was then kept at a temperature of 180° C. for 80 minutes to form a polyimide film thereon. The polyimide film thus formed was then rubbed to prepare a glass substrate (ii) having a polyimide-oriented film formed thereon. The glass substrate (i) and the glass substrate (ii) were positioned opposed to each other in such an arrangement that the rubbed surfaces thereof faced each other. The polymerizable liquid crystal composition (E-5) was then provided interposed between the two sheets of glass substrates. In this arrangement, the gap between the two sheets of glass substrates and the angle made by the rubbing direction thereof were determined to 8 $\mu$m and 180°, respectively. The polymerizable liquid crystal composition clamped by two sheets of glass substrates was placed between two sheets of polarizing plates which cross each other for observation. As a result, it was confirmed that a uniform uniaxial alignment (homogeneous alignment) had been obtained. The polymerizable liquid crystal composition was irradiated with ultraviolet ray of 160 mJ/cm$^2$ from an ultraviolet lamp (UVGL-25 available from UVP) at room temperature so that the polymerizable liquid crystal composition was subjected to photopolymerization for curing. After photopolymerization, the substrates by which the polymer had been clamped were placed between two sheets of polarizing plates for observation. As a result, it was confirmed that the uniform uniaxial alignment (homogeneous alignment) established before photopolymerization was fixed in the polymer, proving that an optically anisotropic film having an excellent uniformity had been obtained. The glass substrate (i) was then peeled off the optically-anisotropic film by a-mechanical force to obtain an optically anisotropic film supported on the glass substrate (ii). In this process, the glass substrate (i) could be easily peeled off the material, and there were observed no components of the optically anisotropic film attached thereto. When peeled off the optically anisotropic film, the glass substrate (i) didn't give any damage such as mark and crack to the optically anisotropic film. Thus, 10 sheets of the optically anisotropic films were prepared. With all these sheets of the optically anisotropic films, peeling could be effected with a good reproducibility. As a result, optically anisotropic films free of mark or crack could be obtained. Even when kept at a temperature of 120° C., the optically anisotropic film maintained the uniform alignment, showing no problem of heat resistivity.

EXAMPLE 35

The glass substrates (i) and (ii) obtained in Example 34 were positioned opposed to each other in such an arrangement that the rubbed surfaces thereof faced each other. The polymerizable liquid crystal composition (E-5) prepared in Example 34 was then provided interposed between the two sheets of glass substrates. In this arrangement, the gap between the two sheets of glass substrates and the angle made by the rubbing direction thereof were determined to 8 μm and 85°, respectively. The polymerizable liquid crystal composition clamped by two sheets of glass substrates was placed between-two sheets of polarizing plates for observation. As a result, it was confirmed that a uniform twisted nematic alignment had been obtained. The polymerizable liquid crystal composition was irradiated with ultraviolet ray of 160 mJ/cm$^2$ from an ultraviolet lamp (UVGL-25 available from UVP) at room temperature so that the polymerizable liquid crystal composition was subjected to photopolymerization for curing. After photopolymerization, the substrates by which the polymer had been clamped was placed between two sheets of polarizing plates for observation. As a result, it was confirmed that the uniform twisted nematic orientation established before photopolymerization was fixed in the polymer, proving that an optically anisotropic film having an excellent uniformity had been obtained. The glass substrate (i) was then peeled off the optically anisotropic film by a mechanical force to obtain an optically anisotropic film supported on the glass substrate (ii). In this process, the glass substrate (i) could be easily peeled off the material, and there were observed no components of the optically anisotropic film attached thereto. When peeled off the optically anisotropic film, the glass substrate (i) didn't give any damage such as mark and crack to the optically anisotropic film. Thus, 10 sheets of the optically anisotropic films were prepared. With all these sheets of the optically anisotropic films, peeling could be effected with a good reproducibility. As a result, optically anisotropic films free of mark or crack could be obtained. Even when kept at a temperature of 120° C., the optically anisotropic film maintained the uniform orientation, showing no problem of heat resistivity.

COMPARATIVE EXAMPLE 1

3.0 g of a polyvinyl alcohol was dissolved in 100 g of water to prepare a solution. The solution thus obtained was then spin-coated onto a glass substrate. The glass substrate was then allowed to cool to room temperature. The glass substrate was then rubbed to obtain a glass substrate (iii) having a polyvinyl alcohol-oriented film formed thereon. The glass substrate (iii) and the glass substrate (ii) prepared in Example 34 were positioned opposed to each other in such an arrangement that the rubbed surfaces thereof faced each other. The polymerizable liquid crystal composition (E-5) prepared in Example 34 was then provided interposed between the two sheets of glass substrates. In this arrangement, the gap between the two sheets of glass substrates and the angle made by the rubbing direction thereof were determined to 8 μm and 180°, respectively. The polymerizable liquid crystal composition clamped by two sheets of glass substrates was placed between two sheets of polarizing plates for observation. As a result, it was confirmed that a uniform uniaxial alignment (homogeneous alignment) had been obtained. The polymerizable liquid crystal composition was irradiated with ultraviolet ray of 160 mJ/cm$^2$ from an ultraviolet lamp- (UVGL-25 available from UVP) at room temperature so that the polymerizable liquid crystal composition was subjected to photopolymerization for curing. After photopolymerization, the substrates by which the polymer had been clamped were placed between two sheets of polarizing plates for observation. As a result, it was confirmed that the uniform uniaxial alignment (homogeneous alignment) established before photopolymerization had been fixed in the polymer, proving that an optically anisotropic film having an excellent uniformity had been obtained. The glass substrate (iii) was then peeled off the optically anisotropic film by a mechanical force in an attempt to obtain an optically anisotropic film supported on the glass substrate (ii). However, the glass substrate could not be smoothly peeled off the optically anisotropic film, and there were observed some components of the optically anisotropic film attached thereto. When peeled off the optically anisotropic film, it was observed that the glass substrate (ii) gave some damage such as mark and crack to the optically anisotropic film. Thus, 10 sheets of the optically anisotropic films were prepared. All these sheets of the optically anisotropic films showed no problem of heat resistivity. However, 8 of the ten sheets of the optically anisotropic films were observed to suffer from damage such as mark and damage, showing a poor yield in the production.

COMPARATIVE EXAMPLE 2

The glass substrate (iii) prepared in Comparative Example 1 and the glass substrate (ii) prepared in Example 34 were positioned opposed to each other in such an arrangement that the rubbed surfaces thereof faced each other. The polymerizable liquid crystal composition (E-5) prepared in Example 34 was then provided interposed between the two sheets of glass substrates. In this arrangement, the gap between the two sheets of glass substrates and the angle made by the rubbing direction thereof were determined to 8 μm and 85°, respectively. The polymerizable liquid crystal composition clamped by two sheets of glass substrates was placed between two sheets of polarizing plates for observation. As a result, it was confirmed that a uniform twisted nematic orientation had been obtained. The polymerizable liquid crystal composition was irradiated with ultraviolet ray of 160 mJ/cm$^2$ from an ultraviolet lamp (UVGL-25 available from UVP) at room temperature so that the polymerizable liquid crystal composition was subjected to photopolymerization for curing. After photopolymerization, the cured product was placed between two sheets of polarizing plates which cross each other for observation. As a result, it was confirmed that the uniform twisted nematic alignment established before photopolymerization had been fixed in the polymer, proving that an optically anisotropic film having an excellent uniformity had been obtained. The glass substrate (iii) was then peeled off the optically anisotropic film by a mechanical force in an attempt to obtain an optically anisotropic film supported on the glass substrate (ii). However, the glass substrate (iii) could not be smoothly peeled off the optically anisotropic film, and there were observed some components of the optically anisotropic film attached thereto. When peeled off the optically anisotropic film, it was observed that the glass substrate (iii) gave some damage such as mark and crack to the optically anisotropic film. Thus, 10 sheets of the optically anisotropic films were prepared. All these sheets of the optically anisotropic films showed no problem of heat resistivity. However, 9 of the ten sheets of the optically anisotropic films were observed to suffer from damage such as mark and damage, showing a poor yield in the production.

EXAMPLE 36

A polycarbonate substrate and a polytetrafluoroethylene substrate which had both been rubbed with rayon cloth were positioned opposed to each other with a gap of 10 μm in such an arrangement that the rubbing direction thereof made an angle of 240°. The polymerizable liquid crystal composition (E-1) obtained in Example 8 was then provided interposed between the two sheets of substrates. The polymerizable liquid crystal composition clamped by the polycarbonate substrate and the polytetrafluoroethylene was irradiated with ultraviolet ray of 200 mJ/cm$^2$ from an ultraviolet lamp (UVGL-25 available from UVP) at room temperature on the polycarbonate substrate side so that it was subjected to photopolymerization for curing to obtain an optically anisotropic film having a 240° dextrally helical structure. The polytetrafluoroethylene substrate was then peeled off the optically anisotropic film thus obtained to obtain an optically anisotropic film supported on the rubbed polycarbonate substrate. The optically anisotropic film thus obtained was then thinly coated with an ultraviolet-curing adhesive "3052B" (available from Tree Bond). The optically anisotropic film was then slowly placed on a glass substrate with the coated surface thereof faced downward. The optically anisotropic film was then irradiated with ultraviolet ray of 300 mJ/cm$^2$ from an ultraviolet lamp (UVGL-25 available from UVP) on the glass substrate side so that the ultraviolet-curing adhesive was cured to bond the optically anisotropic film to the glass substrate. The laminate was kept at a temperature of 150° C. for 5 minutes, and then allowed to cool to room temperature. The polycarbonate substrate was then peeled off the optically anisotropic film to transfer the optically anisotropic film to the glass substrate. The optically anisotropic film thus obtained exhibited a retardation of 0.85 μm.

EXAMPLE 37

Two sheets of glass substrates with an ITO transparent electrode were positioned opposed to each other with a gap of 10 μm in such an arrangement that the ITO surfaces thereof faced inward. The polymerizable liquid crystal composition (G-1) prepared in Example 27 was then provided interposed between the two sheets of glass substrates. The polymerizable liquid crystal composition clamped by the two sheets of glass substrates with an ITO transparent electrode was then observed under a polarizing microscope. As a result, it was confirmed that the polymerizable liquid crystal composition had a nonuniform orientation, i.e., random orientation. A 1 KHz sinusoidal wave having 50 Vrms was applied across the two ITO electrodes by which the randomly-oriented polymerizable liquid crystal composition had been clamped. It was confirmed by a conoscope that the polymerizable liquid crystal composition had been vertically oriented under these conditions. While being vertically oriented under the application of a voltage, the polymerizable liquid crystal composition was irradiated with ultraviolet ray of 160 mJ/cm$^2$ from an ultraviolet lamp (UVGL-25 available from UVP) at room temperature so that the polymerizable liquid crystal composition was subjected to photopolymerization for curing. The optically anisotropic film clamped by the two sheets of glass substrates with an ITO transparent electrode was then observed by a conoscope. As a result, it was confirmed that the vertical orientation established before polymerization had been completely fixed in the polymerizable liquid crystal composition. Further, the optically anisotropic film was placed interposed between two sheets of polarizing plates which cross each other for observation. As a result, the optically anisotropic film showed a uniformly dark view, proving that a uniform vertical orientation was obtained.

One of the glass substrates was then peeled off the optically anisotropic film thus obtained. The optically anisotropic film was then processed in the same manner as in Example 36 to transfer the optically anisotropic film to the glass substrate.

EXAMPLE 38

The polymerizable liquid crystal composition was subjected to photopolymerization for curing in the same manner as in Example 37 except that a 1-mm thick aluminum plate was used instead of the other glass substrate with an ITO transparent electrode. The aluminum plate was then peeled off the material to prepare an optically anisotropic film supported on the glass substrate with an ITO transparent electrode. The optically anisotropic film thus obtained was then observed by a conoscope. As a result, it was confirmed that the vertical orientation established before polymerization had been completely fixed in the polymerizable liquid crystal composition. Further, the optically anisotropic film was placed interposed between two sheets of polarizing plates which cross each other for observation. As a result, the optically anisotropic film showed a uniformly dark view, proving that a uniform vertical orientation was obtained.

The optically anisotropic film was then processed in the same manner as in Example 36 to transfer the optically anisotropic film to the glass substrate.

EXAMPLE 39

The nonpolymerizable liquid crystal composition (M) as used in Example 8 was poured into an STN cell with a cell gap of 6.2 μm and a twist angle of 240° counterclockwise made of two sheets of glass substrates with a transparent electrode having a rubbed polyimide-alignment film to prepare an STN liquid crystal cell.

An optically anisotropic film supported on a rubbed polycarbonate substrate was prepared in the same manner as in Example 36. The optically anisotropic film thus obtained was then thinly coated with an ultraviolet-curing adhesive "3052B" (available from Tree Bond). The optically anisotropic film was then slowly placed on the glass substrate of the foregoing STN liquid crystal cell with the coated surface thereof faced downward. In this arrangement, the rubbing direction of the polycarbonate substrate and the rubbing direction of the glass substrate on the side of the STN liquid crystal cell which is not brought into contact with the ultraviolet-curing adhesive made right angle. The laminate was then irradiated with ultraviolet ray of 300 mJ/cm$^2$ from an ultraviolet lamp (UVGL-25 available from UVP) on the polycarbonate substrate side so that the ultraviolet- curing adhesive was cured to bond the optically anisotropic film to the glass substrate of the STN liquid crystal cell. The laminate was kept at a temperature of 150° C. for 5 minutes, and then allowed to cool to room temperature. The polycarbonate substrate was then peeled off the optically anisotropic film to prepare a liquid crystal cell having an optically anisotropic film supported on the other glass substrate of the STN liquid crystal cell. The liquid crystal cell was clamped by two sheets of polarizing plates which cross each other to prepare a liquid crystal display device. When a voltage was applied across the transparent electrodes of the liquid crystal display device, a uniform black-and-white display was provided over a wide range. The liquid crystal display device also exhibited excellent viewing angle properties.

EXAMPLE 40

An optically anisotropic film supported on a rubbed polycarbonate substrate was prepared in the same manner as in Example 36. The optically anisotropic film thus obtained was then thinly coated with an ultraviolet-curing adhesive "3052B" (available from Tree Bond). The optically anisotropic film was then slowly placed on a polarizing film with the coated surface thereof faced downward. In this arrangement, the rubbing direction of the polycarbonate substrate and the axis of transmission of the polarizing film substrate made an angle of 30°. The laminate was then irradiated with ultraviolet ray of-300 mJ/cm$^2$ from an ultraviolet lamp (UVGL-25 available from UVP) on the polycarbonate substrate side so that the ultraviolet-curing adhesive was cured to bond the optically anisotropic film to the polarizing film substrate. The laminate was kept at a temperature of 100° C. for 30 minutes, and then allowed to cool to room temperature. The polycarbonate substrate was then peeled off the optically anisotropic film to prepare an optically anisotropic film supported on the polarizing film substrate. The optically anisotropic film thus obtained served as a uniform ellipsoidal polarizing film.

The same STN liquid crystal cell as used in Example 39 was clamped by a polarizing film and the foregoing ellipsoidal polarizing film to prepare a liquid crystal display device. In this arrangement, the angle and position made by the axis of transmission of the polarizing film, the rubbing direction of the glass substrate of the STN liquid crystal cell, and the helical structure of the optically anisotropic film were determined as in the liquid crystal display device of Example 39. When a voltage was applied across the transparent electrodes of the liquid crystal display device, a uniform black-and-white display was provided over a wide range. The liquid crystal display device also exhibited excellent viewing angle properties.

EXAMPLE 41

A polymerizable liquid crystal composition (A-1) made of 85% by weight of the polymerizable liquid crystal composition (A) obtained in Example 1 and 15% by weight of a compound represented by formula (N-a):

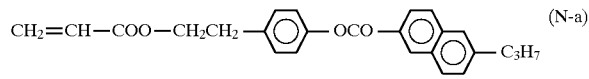

was prepared. The polymerizable liquid crystal composition thus obtained exhibited a nematic phase at room temperature. It also exhibited a refractive index anisotropy of 0.090 at 25° C., proving that the addition of the compound (N-a) caused a rise in the refractive index anisotropy.

A polymerizable liquid crystal composition (A-2) made of 99 parts by weight of the polymerizable liquid crystal composition (A-1) and 1 part by weight of a photopolymerization initiator "IRG-651" (available from Ciba Geigy) was prepared. Two sheets of glass substrates having a rubbed polyimide-oriented film formed thereon were positioned opposed to each other with a gap of 10 μm in such an arrangement that the polyimide-oriented film surfaces thereof faced each other. The polymerizable liquid crystal composition (A-2) was then provided interposed between the two sheets of glass substrates. In this arrangement, the rubbing direction of the two sheets of glass substrates made an angle of 85° counterclockwise. The polymerizable liquid crystal composition (A-2) clamped by the two sheets of glass substrates was placed between two sheets of polarizing plates positioned in such an arrangement that the axis of transmission thereof cross each other for observation. As a result, it was confirmed that the polymerizable liquid crystal composition had a uniform twisted nematic orientation. The polymerizable liquid crystal composition (A-2) was then irradiated with ultraviolet ray of 160 mJ/cm$^2$ from an ultraviolet lamp (UVGL-25 available from UVP) so that it was subjected to photopolymerization for curing to obtain an optically anisotropic film clamped by the two sheets of glass substrates. The optically anisotropic film thus obtained was kept at a temperature of 150° C. for 10 minutes, and then allowed to cool to room temperature. One of the glass substrates was peeled off the optically anisotropic film to obtain an optically anisotropic film supported on the other glass substrate. The optically anisotropic film thus obtained was then placed between two sheets of polarizing plates for observation. As a result, it was confirmed that the uniform twisted nematic orientation established before photopolymerization had been fixed by photopolymerization. Even when stored at a temperature of 120° C., the optically anisotropic film showed no problem of heat resistivity, and there was observed no yellowing.

EXAMPLE 42

A polymerizable liquid crystal composition (F-3) made of 60 parts by weight of the polymerizable liquid crystal composition (F) obtained in Example 15 and 40 parts by weight of the compound (N-a) as used in Example 41 was prepared. The polymerizable liquid crystal composition thus obtained exhibited a nematic phase at room temperature. It also exhibited a refractive index anisotropy of 0.135 at 25° C., proving that the addition of the compound (N-a) caused a rise in the refractive index anisotropy.

A polymerizable liquid crystal composition (F-4) made of 99 parts by weight of the polymerizable liquid crystal composition (F-3) and 1 part by weight of a photoinitiator "IRG-651" (available from Ciba Geigy) was prepared. An optically anisotropic film was obtained in the same manner as in Example 41 except that the polymerizable liquid crystal composition (F-3) was used instead of the polymerizable liquid crystal composition (A-2). The optically anisotropic film thus obtained was then placed between two sheets of polarizing plates for observation. As a result, it was confirmed that the uniform twisted nematic orientation established before photopolymerization had been fixed by photopolymerization. Even when stored at a temperature of 120° C., the optically anisotropic film showed no problem of heat resistivity, and there was observed no yellowing.

While the invention has been described in detail and with reference to specific embodiments thereof, it will be apparent to one skilled in the art that various changes and modifications can be made therein without departing from the spirit and scope thereof.

What is claimed is:

1. A polymerizable liquid crystal composition comprising a first kind of monofunctional (meth)acrylate compound which is a (meth)acrylic ester of a cyclic alcohol, phenol or aromatic hydroxy compound having a liquid crystalline skeleton having at least two 6-membered rings as a partial structure, wherein said composition contains not more than 10% by weight of a liquid crystal compound without a polymerizable functional group and exhibits a liquid crystalline phase at room temperature and wherein the main chain of the polymer obtained by the polymerization of the first (meth)acrylate compound has a rigid liquid crystalline skeleton directly connected thereto without any spacer.

2. A polymerizable liquid crystal composition comprising a first kind of monofunctional (meth)acrylate compound represented by the following general formula (I):

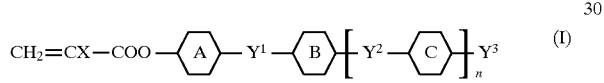

wherein X represents a hydrogen atom or a methyl group; the 6-membered rings A, B and C each independently represent

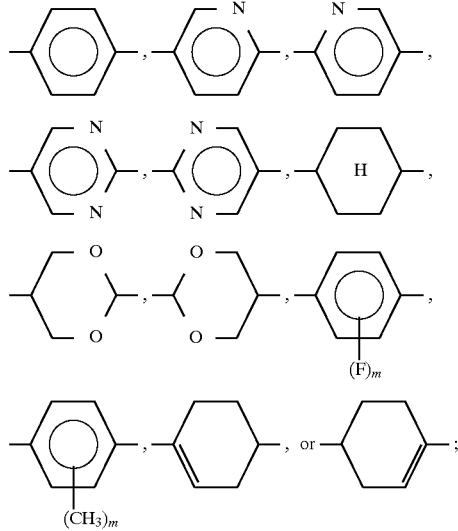

n represents an integer 0 or 1; m represents an integer of 1 to 4; $Y^1$ and $Y^2$ each independently represent a single bond, $-CH_2CH_2-$, $-CH_2O-$, $-OCH_2-$, $-COO-$, $-OCO-$, $-C\equiv C-$, $-CH=CH-$, $-CF=CF-$, $-(CH_2)_4-$, $-CH_2CH_2CH_2-O-$, $-OCH_2CH_2CH_2-$, $-CH=CHCH_2CH_2-$ or $-CH_2CH_2CH=CH-$; and $Y^3$ represents a hydrogen atom, a halogen atom, a cyano group, a $C_{1-20}$ alkyl group, a $C_{1-20}$ alkoxy group, a $C_{1-20}$ alkenyl group or a $C_{1-20}$ alkenyloxy group, said composition containing no more than 10% by weight of a liquid crystal compound without a polymerizable functional group and exhibiting a liquid crystalline phase at room temperature.

3. The polymerizable liquid crystal composition as in claim 2, wherein in the general formula (I) the 6-membered rings A, B and C each independently represent

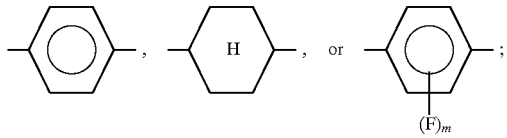

m represents an integer 1 or 2; $Y^1$ and $Y^2$ each independently represent a single bond or $-C\equiv C-$; and $Y^3$ represents a halogen atom, a cyano group, a $C_{1-20}$ alkyl group or a $C_{1-20}$ alkoxy group.

4. The polymerizable liquid crystal composition as in claim 3, wherein in the general formula (I) n represents 0, and $Y^3$ represents a halogen atom, a cyano group, a $C_{1-20}$ alkyl group or a $C_{1-20}$ alkoxy group.

5. The polymerizable liquid crystal composition as in claim 4, wherein in the general formula (I) the 6-membered ring A represents

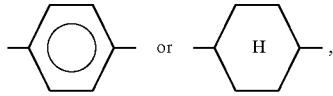

the 6-membered ring B represents

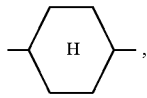

and $Y^3$ represents a $C_{1-10}$ alkyl group.

6. The polymerizable liquid crystal composition as in claim 4, wherein in the general formula (I) the 6-membered rings A and B each represent

7. The polymerizable liquid crystal composition as in claim 6, wherein in the general formula (I) $Y^1$ represents a single bond, and $Y^3$ represents a $C_{1-10}$ alkyl group, a $C_{1-10}$ alkoxy group or a cyano group.

8. The polymerizable liquid crystal composition as in claim 6, wherein in the general formula (I) $Y^1$ represents $-C\equiv C-$, and $Y^3$ represents a $C_{1-10}$ alkyl group.

9. The polymerizable liquid crystal composition as in claim 4, wherein in the general formula (I) the 6-membered ring A represents

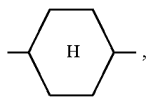

the 6-membered ring B represents

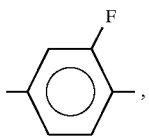

$Y^1$ represents a single bond, and $Y^3$ represents a fluorine atom.

10. The polymerizable liquid crystal composition as in claim 3, wherein in the general formula (I) n represents 1, $Y^1$

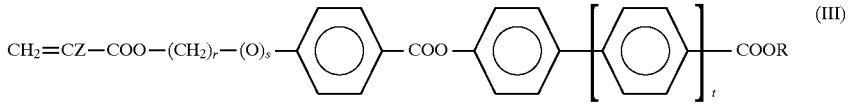

and $Y^2$ each represent a single bond, and $Y^3$ represents a halogen atom or a $C_{1-20}$ alkyl group.

11. The polymerizable liquid crystal composition as in claim 10, wherein in the general formula (I) the 6-membered ring A represents

the 6-membered rings B and C each represent

and $Y^3$ represents a $C_{1-10}$ alkyl group.

12. The polymerizable liquid crystal composition as in claim 10, wherein in the general formula (I) the 6-membered rings A and B each represent

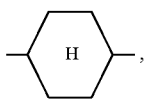

the 6-membered ring C represents

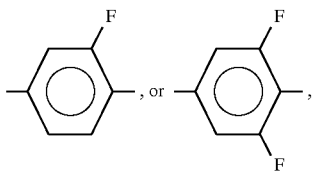

and $Y^3$ represents a fluorine atom.

13. The polymerizable liquid crystal composition as in claim 3, wherein said monofunctional (meth)acrylate compound represented by the general formula (I) exhibits a nematic phase.

14. A polymerizable liquid crystal composition comprising a first kind of monofunctional (meth)acrylate compound which is a (meth)acrylic ester of a cyclic alcohol, phenol or aromatic hydroxy compound having a liquid crystalline skeleton having at least two 6-membered rings as a partial structure, said composition further comprising a chiral compound, and wherein said composition contains not more than 10% by weight of a liquid crystal compound without a polymerizable functional group and exhibits a liquid crystalline phase at room temperature.

15. The polymerizable liquid crystal composition as in claim 14, wherein said chiral compound is a (meth)acrylate compound containing an optically active group and said polymerizable liquid crystal composition exhibits a chiral nematic phase.

16. The polymerizable liquid crystal composition as in claim 15, wherein said (meth)acrylate compound containing an optically active group is a compound represented by the following general formula (III):

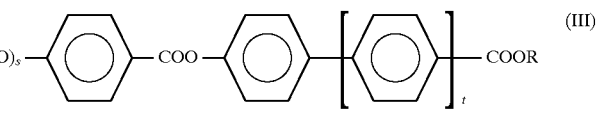

wherein Z represents a hydrogen atom or a methyl group; s represents an integer of 0 or 1; r represents an integer of 0 to 12 when s is 0 or an integer of 1 to 12 when s is 1; t represents an integer of 0 or 1; and R represents a $C_{3-12}$ optically active hydrocarbon group.

17. The polymerizable liquid crystal composition as in claim 16, wherein in the general formula (III) t represents an integer 0, and R represents an optically active 1-methylheptyl group.

18. The polymerizable liquid crystal composition as in claim 14, wherein the pitch of said polymerizable liquid crystal composition is in the range of 0.1 to 60 µm.

19. The polymerizable liquid crystal composition as in claim 2 or 14, further comprising a second kind of monofunctional (meth)acrylate compound represented by the following general formula (II):

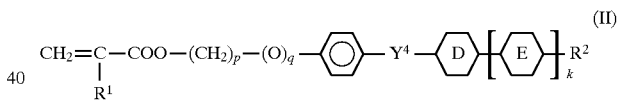

wherein $R^1$ represents a hydrogen atom or a methyl group; p represents an integer of 2 to 12; q represents an integer of 0 or 1; $Y^4$ represents a single bond, —COO— or —OCO—; the rings D and E each independently represent

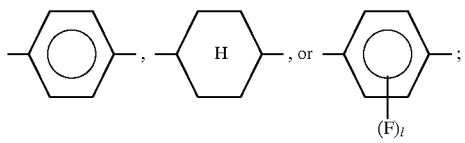

l represents an integer of 1 to 4; k represents an integer 0 or 1; and $R^2$ represents a hydrogen atom, a halogen atom, a cyano group, a $C_{1-20}$ alkyl group, a $C_{1-20}$ alkoxy group, a $C_{1-20}$ alkenyl group or a phenyl group, wherein said composition exhibits an enantiotropically nematic phase at room temperature.

20. The polymerizable liquid crystal composition as in claim 1 or 14, further comprising a monofunctional (meth)acrylate compound having a 2,6-substituted naphthalene skeleton, wherein said composition exhibits an enantiotropically nematic phase at room temperature.

21. The polymerizable liquid crystal composition as in claim 20, wherein said monofunctional (meth)acrylate compound having a 2,6-substituted naphthalene skeleton is a compound represented by the following general formula (N):

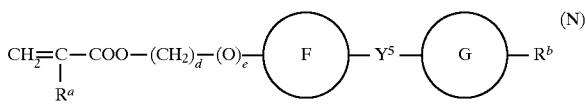

wherein $R^a$ represents a hydrogen atom or a methyl group; e represents an integer of 0 or 1; d represents an integer 0 to 12 when e is 0 or an integer of 1 to 12 when e is 1; $R^b$ represents a $C_{1-12}$ alkyl or alkoxy group; $Y^5$ represents —$CH_2CH_2$—, —COO—, —OCO—, —$COCH_2$— or —$CH_2O$—; and one of the rings F and G represents

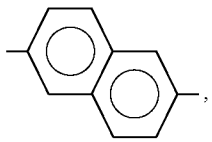

and the other represents

22. An optically anisotropic film comprising a photopolymerization product of a polymerizable liquid crystal composition comprising a first kind of monofunctional (meth) acrylate compound which is a (meth)acrylic ester of a cyclic alcohol, phenol or aromatic hydroxy compound having a liquid crystalline skeleton having at least two 6-membered rings as a partial structure, wherein said composition contains not more than 10% by wight of a liquid crystal compound without a polymerizable functional group and exhibits a liquid crystalline phase at room temperature and wherein the main chain of the polymer obtained by the polymerization of the first (meth)acrylate compound has a rigid liquid crystalline skeleton directly connected thereto without any spacer.

23. The optically anisotropic film as in claim 22, wherein the helix angle due to twisted nematic orientation in said photopolymerization product is in the range of 30° to 360°.

24. The optically anisotropic film as in claim 23, wherein said optically anisotropic film is a polymerization product of a polymerizable liquid crystal composition which exhibits a chiral nematic phase or cholesteric phase, the structure is fixed in said optically anisotropic film, and the thickness of said optically anisotropic film is greater than the pitch of said polymerizable liquid crystal composition.

25. The optically anisotropic film as in claim 22, wherein said optically anisotropic film is a polymer obtained by the photopolymerization of a polymerizable liquid crystal composition in a homeotropic alignment, a homogeneous alignment or a hybrid alignment comprising a continuous change from vertical alignment to horizontal alignment in the thickwise direction.

26. The optically anisotropic film as in claim 22, wherein said optically anisotropic film has partially different optical phase retardation.

27. The optically anisotropic film as in any one of claims 22 to 26, wherein said optically anisotropic film is supported on or clamped by at least one substrate.

28. The optically anisotropic film as in claim 27, wherein said substrate has been subjected to rubbing or has an alignment layer.

29. The optically anisotropic film as in claim 27, wherein said substrate is selected from the group consisting of a transparent plastic film, a glass substrate and a polarizing film.

30. A liquid crystal display device comprising an optically anisotropic film comprising a photopolymerization product of a polymerizable liquid crystal composition comprising a first kind of monofunctional (meth)acrylate compound which is a (meth)acrylic ester of a cyclic alcohol, phenol or aromatic hydroxy compound having a liquid crystalline skeleton having at least two 6-membered rings as a partial structure, wherein said composition contains not more than 10% by weight of a liquid crystal compound without a polymerizable functional group and exhibits a liquid crystalline phase at room temperature and wherein the main chain of the polymer obtained by the polymerization of the first (meth)acrylate compound has a rigid liquid crystalline skeleton directly connected thereto without any spacer.

31. The liquid crystal display device as in claim 30, wherein said liquid crystal device is of twisted nematic type or supertwisted nematic type.

32. The liquid crystal display device as in claim 30, wherein said liquid crystal display device is of polymer dispersed liquid crystal type.

33. A process for producing an optically anisotropic film comprising a photopolymerization product of a polymerizable liquid crystal composition comprising a first kind of monofunctional (meth)acrylate compound which is a (meth) acrylic ester of a cyclic alcohol, phenol or aromatic hydroxy compound having a liquid crystalline skeleton having at least two 6-membered rings as a partial structure, wherein said composition contains not more than 10% by weight of a liquid crystal compound without a polymerizable functional group and exhibits a liquid crystalline phase at room temperature, which comprises (1) a first step of allowing the polymerizable liquid crystal composition to be interposed between a first kind of transparent substrate which is treated to align the liquid crystal and a second kind of substrate which is treated to align the liquid crystal, and (2) a second step of irradiating the material with light on the first kind of transparent substrate side, and wherein the main chain of the polymer obtained by the polymerization of the first (meth) acrylate compound has a rigid liquid crystalline skeleton directly connected thereto without any spacer.

34. The process as in claim 33, wherein said second kind of substrate is a substrate which is treated to align the liquid crystal.

35. A process for producing an optically anisotropic film comprising a photopolymerization product of a polymerizable liquid crystal composition comprising a first kind of monofunctional (meth)acrylate compound which is a (meth) acrylic ester of a cyclic alcohol, phenol or aromatic hydroxy compound having a liquid crystalline skeleton having at least two 6-membered rings as a partial structure, wherein said composition contains not more than 10% by weight of a liquid crystal compound without a polymerizable functional group and exhibits a liquid crystalline phase at room temperature, which comprises (1) a first step of allowing the polymerizable liquid crystal composition to be interposed between a first kind of transparent substrate having an electrically conducting layer and a second kind of electrically conducting substrate, and (2) a second step of irradiating the material with light on the first kind of transparent substrate side with a voltage being applied across said two substrates, and wherein the main chain of the polymer obtained by the polymerization of the first (meth)acrylate compound has a rigid liquid crystalline skeleton directly connected thereto without any spacer.

36. The process as in claim 35, wherein said first kind of transparent substrate is a substrate comprising an ITO electrode layer.

37. The process as in claim 35 or 36, wherein both said first kind of transparent substrate and second kind of substrate are substrates which are treated to align the liquid crystals in the first step and the applied voltage is controlled every pixel in the second step.

38. The process as in any one of claims 33 or 36, further comprising (3) a third step of peeling said first kind of transparent substrate and said second kind of substrate off the material.

39. The process as in any one of claims 33 or 36, further comprising (3) a third step of peeling said second kind of substrate off the material.

40. The process as in any one of claims 33 or 36, wherein in the first step said substrate comprises an oriented layer made of a polyvinyl alcohol and a dihydroxy compound represented by the following general formula (IV):

HO—R³—OH    (IV)

wherein $R^3$ represents a $C_{6-16}$ divalent organic group.

41. The process as in claim 38 or 39, further comprising (4) a fourth step of transferring an optically anisotropic film obtained in said third step onto a third kind of transparent substrate.

42. The optically anisotropic film as in claim 22, wherein said first kind of monofunctional (meth)acrylate compound is a compound represented by the formula (I):

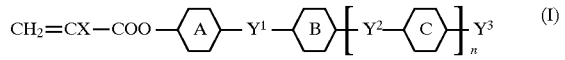

wherein X represents a hydrogen atom or a methyl group; the 6-membered rings A, B and C each independently represent

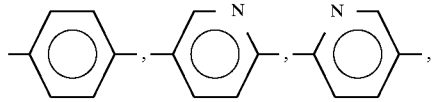

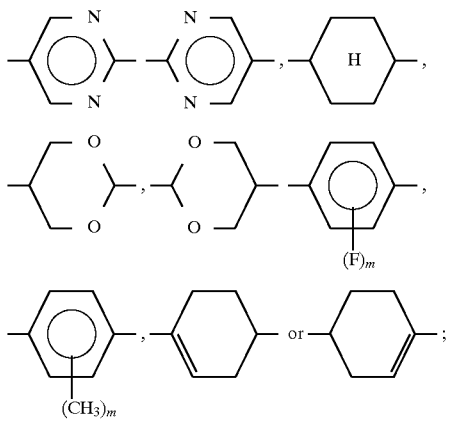

n represents an integer 0 or 1; m represents an integer of 1 to 4; $Y^1$ and $Y^2$ each independently represent a single bond, —CHCH₂—, —CH₂O—, —OCH₂—, —C≡C—, —CH=CH—, —CF=CF—, —(CH₂)₄—, —CH₂CH₂CH₂O—, —OCH₂CH₂CH₂—, —CH=CHCH₂CH₂ or —CH₂CH₂CH=CH—; and $Y^3$ represents a hydrogen atom, a halogen atom, a cyano group, a $C_{1-20}$ alkyl group, a $C_{1-20}$ alkoxy group, a $C_{1-20}$ alkenyl group or a $C_{1-20}$ alkenyloxy group; wherein when the 6-membered rings A and B each represent

n is 0 and $Y^1$ represents a single bond or —C≡C—, $Y^3$ represents a $C_{1-20}$ alkyl group; wherein when n is 1 and $Y^1$ and $Y^2$ each represent a single bond, $Y^3$ represents a halogen atom or a $C_{1-20}$ alkyl group; and wherein said composition exhibits a liquid crystalline phase.

* * * * *